(12) United States Patent
Nishiura et al.

(10) Patent No.: US 6,497,127 B2
(45) Date of Patent: Dec. 24, 2002

(54) METHOD FOR SUPPLYING ROLLING OIL FOR COLD ROLLING

(75) Inventors: Nobuo Nishiura; Yasuhiro Sodani; Yukio Kimura, all of Fukuyama; Hiroyoshi Sakai, Kawasaki, all of (JP); Yoshiki Sakurai, Farmington Hills, MI (US); Shigehiro Tomotsune, Valparaiso, IN (US)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/991,793

(22) Filed: Nov. 5, 2001

(65) Prior Publication Data

US 2002/0121118 A1 Sep. 5, 2002

Related U.S. Application Data

(63) Continuation of application No. PCT/JP00/01431, filed on Mar. 9, 2000.

(51) Int. Cl.$^7$ .............................................. B21B 45/02
(52) U.S. Cl. .............................. 72/44; 72/201; 72/236
(58) Field of Search ................................. 72/41, 43, 44, 72/45, 201, 236

(56) References Cited

FOREIGN PATENT DOCUMENTS

| JP | 57-079016 A | 5/1982 |
|---|---|---|
| JP | 58-5731 B2 | 2/1983 |
| JP | 59-24888 B2 | 6/1984 |
| JP | 61-111713 A | 5/1986 |
| JP | 61-253101 A | 11/1986 |
| JP | 63-5167 B2 | 2/1988 |
| JP | 2-37911 A | 2/1990 |
| JP | 6-13126 B2 | 2/1994 |
| JP | 7-214121 A | 8/1995 |
| JP | 9-122733 A | 5/1997 |

*Primary Examiner*—Lowell A. Larson
(74) *Attorney, Agent, or Firm*—Frishauf, Holtz, Goodman & Chick, P.C.

(57) ABSTRACT

A method for supplying rolling oil for cold rolling is provided wherein emulsion rolling oil is supplied using both: (i) a first rolling oil supply system for sypplying the emulsion rolling oil to a roll and a steel sheet being rolled in a recirculation mode, and (ii) a second rolling oil supply system for supplying the emulsion rolling oil to only the front and back surface of the stell sheet. The emulsion rolling oil supplied by the first and second supply systems comprise an emulsifier of a same type and concentration, and the second supply system is controlled so that an average particle diameter of emulsion is larger than an average particle diameter of emulsion of the first supply system. The emulsion of the second supply system, which has not stuck onto the steel sheet being rolled, is then joined to the emulsion of the first supply system.

12 Claims, 30 Drawing Sheets

AVERAGE PARTICLE DIAMETER (μm) OF EMULSION

METHOD FOR SUPPLYING ROLLING OIL FOR COLD ROLLING

This application is a continuation application of International Application PCT/JP00/01431 (not published in English) filed Mar. 9, 2000.

BACKGROUND OF THE INVENTION

1. Field of the Invention

The present invention relates to a method for supplying rolling oil for cold rolling and, more particularly, to a method for supplying rolling oil in a recirculation mode in cold tandem rolling using a plurality of rolling mill stands.

2. Description of Related Arts

In cold rolling, lubrication is needed to decrease friction between a steel sheet and a roll during rolling, and also the roll and the steel sheet must be cooled to remove frictional heat and working heat.

Usually, in cold rolling, lubrication is performed by using emulsion rolling oil. Emulsion is a mixed liquid in which particles of rolling oil exist in a state of being suspended stably in water, and is characterized by particle diameter and concentration. The particle diameter of emulsion means the particle diameter of rolling oil in emulsion, and the concentration of emulsion means the ratio of oil volume to total volume of emulsion. Emulsion is prepared by adding a predetermined quantity of emulsifier with a concentration with respect to the amount of rolling oil, and then by applying shearing by means of an agitator or a pump. The methods for supplying emulsion rolling oil in cold rolling involve a direct mode, a recirculation mode, and a hybrid mode which is a compromise between the former two modes.

In the direct mode, high concentration emulsion rolling oil is sprayed on a steel sheet for the purpose of lubrication, and water is sprayed on a roll for the purpose of cooling. Therefore, this mode has higher lubricating and cooling abilities than the recirculation mode. In this mode, however, since the emulsion rolling oil is not recirculated, the unit consumption of rolling oil is high.

On the other hand, in the recirculation mode, low concentration emulsion rolling oil, prepared in advance by mixing and agitating rolling oil and cooling water, is sprayed on a steel sheet and a roll for the purpose of lubrication and cooling while being recirculated. Therefore, the unit consumption of rolling oil is low. However, this mode has lower lubricating and cooling abilities than the direct mode, so that lubrication is insufficient at the time of high speed rolling, for example, in the case where a thin steel sheet with a thickness not larger than 0.2 mm is rolled, and also vibration of a rolling mill called chattering and surface defect called heat scratch are liable to occur.

In order to improve the lubricating ability in the method for supplying rolling oil in the recirculation mode, JP-59-24888 (the term "JP-B" referred to herein signifies "Examined Japanese Patent Publication") has disclosed a method in which rolling oil with a concentration not lower than 10% is sprayed directly on the back surface of a steel sheet at a rate of 100 to 200 l/min just before rolling. With this method, however, the lubricating ability is not improved fully for the following reasons i) and ii).

i) A phenomenon that oil in the sprayed emulsion sticks to the front surface of steel sheet is called plate out. The inventors conducted studies on the relationship between the ratio of the quantity of plate out oil to the quantity of oil contained in the supplied emulsion (hereinafter referred to as a sticking efficiency) and the concentration. As a result, it was found that if only the concentration of emulsion was increased, the sticking efficiency decreased, so that the plate out amount necessary for lubrication could not be obtained.

ii) At the time of high speed rolling, a heat scratch develops not only on the back surface but also on the front surface of the steel sheet.

JP-B-58-5731 and JP-A-9-122733 (the term "JP-A" referred to herein signifies "Unexamined Japanese Patent Publication") have disclosed a method of the hybrid mode in which apart from a rolling oil supply system for supplying low temperature emulsion with a low concentration lower than 10%, high concentration emulsion, which has been prepared by adding rolling oil to the extract of the recirculating emulsion, is heated to a high temperature of 75° C., and is sprayed directly on a steel sheet just before rolling. With this method, however, not only the lubricating ability is not improved sufficiently, but also the equipment cost increases remarkably for the following reasons iii) and iv).

iii) Even if the temperature of emulsion is increased, the sticking efficiency is not always increased, depending on an emulsifying dispersant constituting the emulsion. Also, as described in item i), even if the concentration of emulsion is increased, a sufficient plate out amount is not obtained. Furthermore, an extra device such as a heater is needed to heat and pressurize the emulsion, and also equipment such as a large sized cooler is needed for the rolling oil supply system because the mixing of the high temperature emulsion for the rolling oil supply system raises the temperature.

iv) In the hybrid mode, when the recirculating emulsion is extracted, the characteristics such as ESI (Emulsion Stability Index), concentration of iron, saponification value, and acid value of the recirculating emulsion are not fixed, so that chemical treatment for making these characteristics fixed and complicated equipment such as a filter for removing iron are needed. Also, if the characteristics of the extracted emulsion change once, the characteristics of the emulsion of the hybrid mode change accordingly.

JP-A-2-37911 has disclosed a method in which an emulsifier added to the high concentration emulsion is of the same kind as that of the recirculating emulsion, and only the quantity of added emulsifier is changed to decrease the ESI, by which the emulsion is sprayed directly on a steel sheet. With this method, however, emulsion of the hybrid mode, which has a low ESI and unstable emulsifying dispersibility, is included in a rolling oil supply tank, so that the ESI of the recirculating emulsion changes with time and the emulsifying dispersibility becomes unstable. Therefore, excessive lubrication occurs, and slip occurs at all rolling mil stands, whereby rolling becomes unstable.

JP-B-63-5167 has disclosed a method in which using an ionic emulsifier, which does not yield salt or is less liable to yield salt, emulsion with unstable emulsifying dispersibility is sprayed directly on a steel sheet, and then the emulsion is included in a rolling oil supply tank to which a water soluble negative ionic substance is added excessively, by which emulsification is stabilized. Since the rolling oil supply tank of a lubrication system generally has a high capacity of about 10,000 liters, in this method, a large quantity of negative ionic substance must be added in advance into the tank. Therefore, the emulsifying dispersibility of emulsion in the tank varies easily. Also, when an ionic emulsifier less liable to yield salt is used, a salt yielding reaction with emulsion is difficult to take place, so that the emulsion in the tank becomes unstable.

JP-B-6-13126 has disclosed a method in which the quantity of supplied emulsion is controlled to establish a proper lubrication state. With this method, however, since the change range of forward slip ratio is narrow, it is difficult to control the quantity of supplied emulsion so as to obtain the target forward slip ratio, so that a proper lubrication state cannot be established.

SUMMARY OF THE INVENTION

The present invention has been made to solve the above problems with the prior art, and accordingly an object thereof is to provide a method for supplying rolling oil for cold rolling in a recirculation mode which can achieve sufficient lubricating ability, capable of preventing the occurrence of chattering and heat scratch even at the time of high speed rolling, steadily at a low cost.

To achieve the above object, the present invention provides a method for supplying rolling oil for cold rolling wherein emulsion rolling oil is supplied using both: (i) a first rolling oil supply system for supplying the emulsion rolling oil to a roll and a steel sheet being rolled in a recirculation mode, and (ii) a second rolling oil supply system for supplying the emulsion rolling oil to only the front and back surface of the steel sheet being rolled. The emulsion rolling oil supplied by the first and second rolling oil supply systems comprise an emulsifier of a same type and concentration, and the second rolling oil supply system is controlled so that an average particle diameter of emulsion is larger than an average particle diameter of emulsion of the first rolling oil supply system. The emulsion of the second rolling oil supply system, which has not stuck onto the steel sheet being rolled, is the joined to the emulsion of the first rolling oil supply system.

Also, to achieve the above object, the present invention provides another method for supplying rolling oil for cold rolling wherein emulsion rolling oil is supplied using both: (i) a first rolling oil supply system for supplying the emulsion rolling oil to a roll and a steel sheet being rolled in a recirculation mode, and (ii) a second rolling oil supply system supplying the emulsion rolling oil to only the front and back surface of the steel sheet being rolled. According to this method, the emulsion rolling oil supplied by the second rolling oil supply system comprises an emulsifier of a same type but lower concentration as an emulsifier of the first rolling oil supply system, and the second rolling oil supply system is controlled so that an average particle diameter of emulsion is larger than an average particle diameter of emulsion of the first rolling oil supply system. The emulsion of the second rolling oil supply system which has not stuck onto the steel sheet being rolled is then recovered, additional emulsifier is added to the recovered emulsion so that the concentration of the emulsifier is equal to that of the emulsifier of the first rolling oil supply system, and the emulsion of the second rolling oil supply system is mechanically agitated. The emulsion of the second rolling oil supply system, having been agitated mechanically, is then joined to the emulsion of the first rolling oil supply system.

DETAILED DESCRIPTION OF THE INVENTION

First Embodiment

Figure 1:
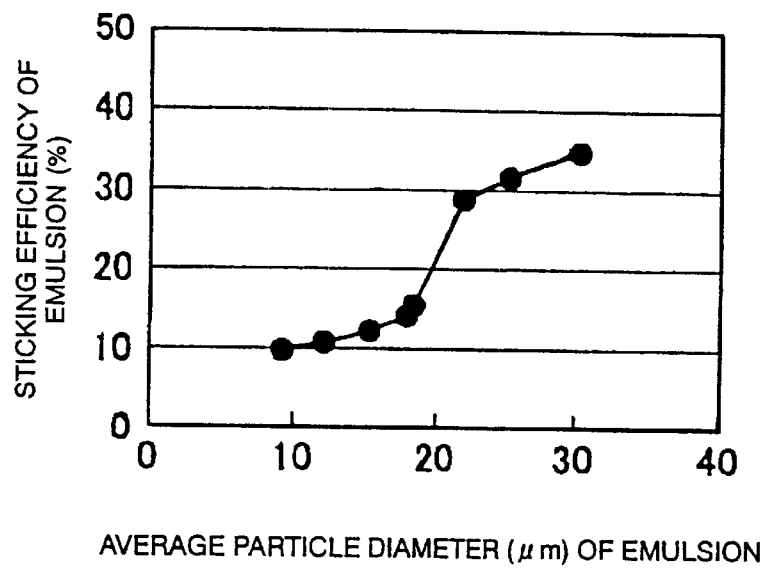
FIG. 1 is a graph showing the relationship between the average particle diameter and the sticking efficiency of emulsion.
Figure 2:
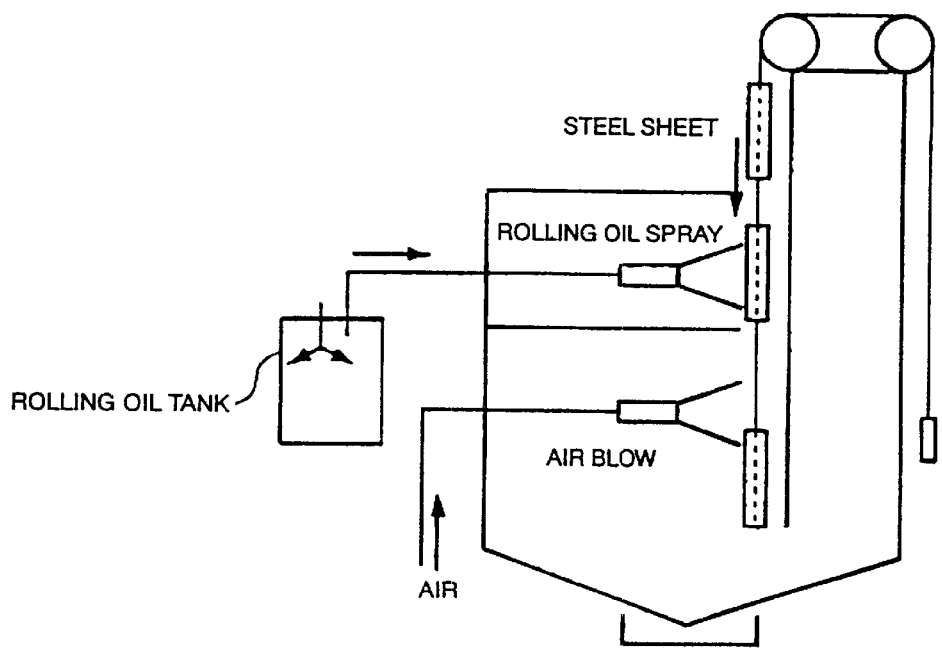
FIG. 2 is a schematic view showing a plate out test.

FIG. 1 shows the relationship between the average particle diameter of emulsion and the sticking efficiency of emulsion sticking onto a steel sheet, which is determined by conducting a plate out test (in which rolling oil is sprayed, and after a predetermined time has elapsed, rolling oil that has not been plated out is blown off by air blow) shown in FIG. 2 under the conditions given in Table 1.

The sticking efficiency increases as the average particle diameter of emulsion increases, and especially, it increases greatly when the average particle diameter is 20 $\mu$m or larger.

TABLE 1

| Base oil | Beef tallow |
|---|---|
| Concentration of emulsion | 10% |
| Temperature of emulsion | 60° C. |
| Flow rate of emulsion | 0.1 l/m$^2$ |
| Spray pressure | 2 kg/cm$^2$ |
| Nozzle type | Flat nozzle |
| Steel sheet-to-nozzle distance | 110 mm |
| Temperature of steel sheet | 150° C. |
| Phase inversion time | 0.1 sec |

Therefore, apart from a first rolling oil supply system conventionally supplying emulsion rolling oil to a roll and a steel sheet being rolled in a recirculation mode for the purpose of lubrication and cooling, a second rolling oil supply system supplying emulsion rolling oil to the steel sheet being rolled only for the purpose of lubrication is provided. Thus, emulsion rolling oil consisting of emulsion controlled so as to have an average particle diameter larger than that of emulsion supplied from the first rolling oil supply system, especially to have an average particle diameter of 20 $\mu$m or larger, is supplied from the second rolling oil supply system. Thereby, the sticking efficiency of emulsion is increased, so that the lubricating ability can be improved greatly.

By dividing the rolling oil supply system in this manner, the lubricating ability of only downstream rolling mill stands, which are liable to be poorly lubricated at the time of high speed tandem rolling, can be improved, and thus upstream mill stands, which are well lubricated, are not lubricated excessively. Also, since the second rolling oil supply system is merely provided, the equipment cost is not increased so much.

Figure 3:
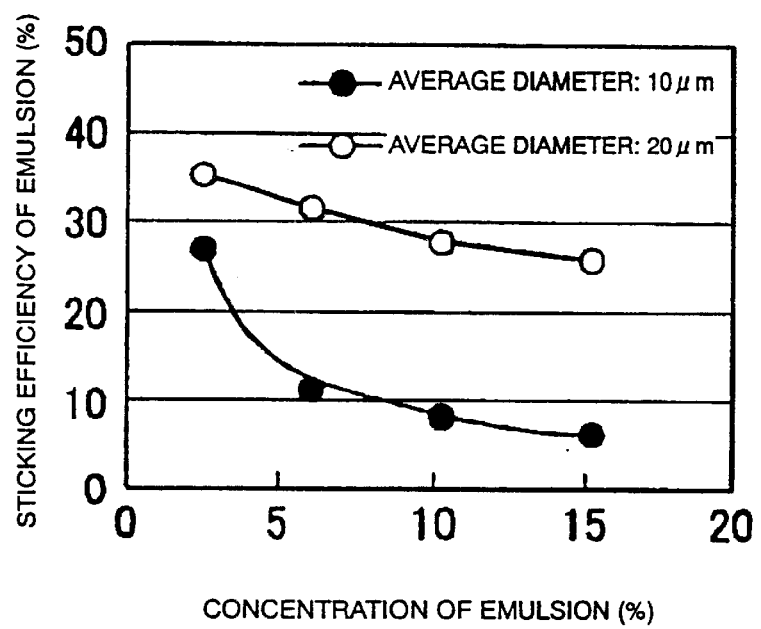
FIG. 3 is a graph showing the relationship between the concentration and the sticking efficiency of emulsion.

FIG. 3 shows the relationship between the concentration of emulsion and the sticking efficiency of emulsion sticking onto a steel sheet, which is determined by conducting a plate out test under the conditions given in Table 2.

TABLE 2

| Base oil | Beef tallow |
|---|---|
| Average particle diameter of emulsion | 10, 20 $\mu$m |
| Temperature of emulsion | 60° C. |
| Flow rate of emulsion | 0.1 l/m$^2$ |
| Spray pressure | 2 kg/cm$^2$ |
| Nozzle type | Flat nozzle |
| Steel sheet-to-nozzle distance | 110 mm |
| Temperature of steel sheet | 150° C. |
| Phase inversion time | 0.1 sec |

The sticking efficiency decreases as the concentration of emulsion increases. However, in the case where the average particle diameter of emulsion is 20 $\mu$m, the degree of sticking efficiency with respect to the concentration of emulsion decreases. Therefore, at the time of high speed rolling, the spray time shortens with an increase in speed, and thus the quantity of supplied rolling oil per unit area of steel sheet decreases. Thus, the test result shows that even if the concentration and temperature of emulsion are increased as before, a sufficient effect is not achieved, and the increase in average particle diameter as in the present invention is effective.

The emulsion rolling oil of the second rolling oil supply system must be supplied onto the front and back surface of the steel sheet because a heat scratch sometimes develops not only on the back surface but also on the front surface of the steel sheet at the time of high speed rolling.

Also, the emulsion of the second rolling oil supply system is newly prepared by using stock rolling oil, an emulsifier, and dilution water to obtain stable lubricating ability. At this time, if an emulsifier that has the same type and the same concentration with respect to the amount of oil as those of the emulsifier of the first rolling oil supply system is used as an emulsifier added for emulsifying dispersion, an adverse influence exerted when the emulsion of the second rolling oil supply system is included in a first rolling oil supply tank can be eliminated.

Further, if the emulsion of the second rolling oil supply system that has not stuck onto the steel sheet, and the emulsion of the first rolling oil supply system are joined to each other, the emulsion of the second rolling oil supply system is repeatedly subjected to strong shearing not only in the tank but also in a pump and a nozzle at the halfway positions of recirculation so that it is pulverized finer to the same particle diameter as that of the emulsion of the first rolling oil supply system, by which emulsion having stable emulsifying dispersibility is provided. Therefore, the stability of emulsifying dispersion of the first rolling oil supply system can be maintained.

Figure 4:
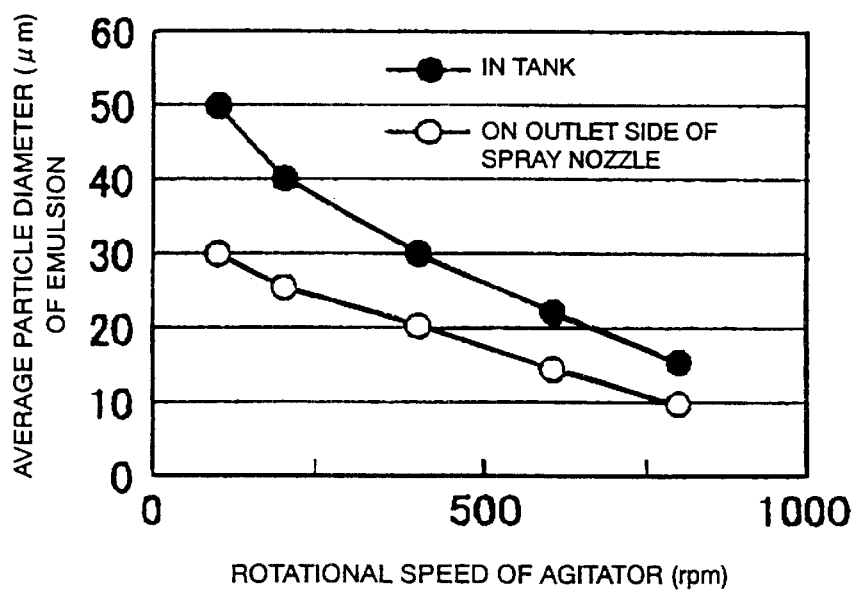
FIG. 4 is a graph showing the relationship between the average particle diameter of emulsion and the rotational speed of an agitator in a tank.

As shown in FIG. 4, in order to increase the average particle diameter of emulsion, it is necessary only to decrease the rotational speed of an agitator in a tank provided in the second rolling oil supply system. In particular, in order to increase the average particle diameter of emulsion to 20 μm or larger, the rotational speed must be decreased to 400 rpm or lower. In FIG. 4, the average particle diameter of emulsion is slightly smaller on the outlet side of spray nozzle for supplying rolling oil than in the tank. The reason for this is that the emulsion is subjected to shearing in a supply pump and in a nozzle.

Figure 5:
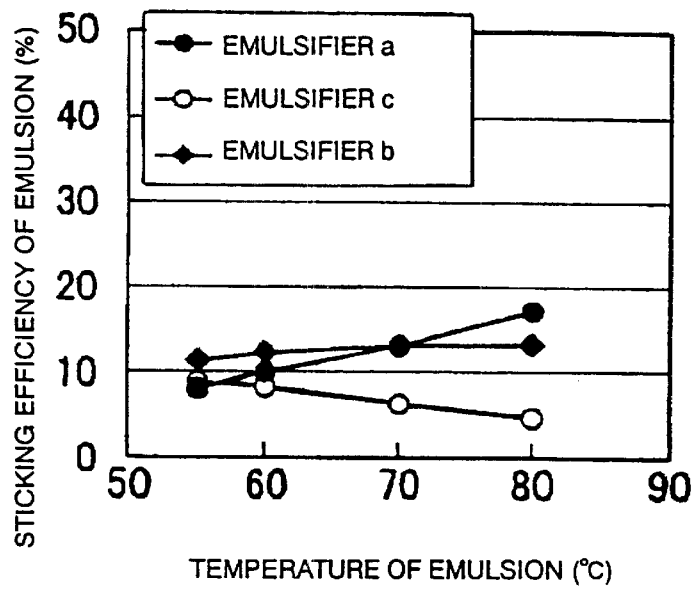
FIG. 5 is a graph showing the relationship between the temperature and the sticking efficiency of emulsion.

FIG. 5 shows the relationship between the temperature of emulsion and the sticking efficiency of emulsion sticking onto a steel sheet, which is determined by conducting a plate out test under the conditions given in Table 3 using emulsifiers a, b and c as an emulsifying dispersant.

TABLE 3

| Base oil | Beef tallow |
|---|---|
| Concentration of emulsion | 10% |
| Average particle diameter of emulsion | 10 μm |
| Flow rate of emulsion | 0.1 l/m² |
| Spray pressure | 2 kg/cm² |
| Nozzle type | Flat nozzle |
| Steel sheet-to-nozzle distance | 110 mm |
| Temperature of steel sheet | 150° C. |
| Phase inversion time | 0.1 sec |

If the temperature of emulsion is increased, the plate out amount may decrease as in the case of the emulsifier c, or the plate out amount may increase as in the cases of the emulsifiers a and b, but the amount of increase in sticking efficiency is small. Also, a heater is needed to keep the emulsion at a high temperature, and also when the emulsion is included in the first rolling oil supply system, a cooler is needed to restrain the rise in temperature. Therefore, it is desirable that the temperatures of the emulsion of the second rolling oil supply system and the first rolling oil supply system be equal.

The concentration and supply amount of emulsion of the second rolling oil supply system are determined by a method described below.

Taking the plate out amount as $P\phi$, and the smallest plate out amount, which does not produce heat scratch and chattering, as $P\phi min$ (mg/m²), the following equation (2) is obtained.

$$P\phi min \geq P\phi \qquad (2)$$

Figure 6:
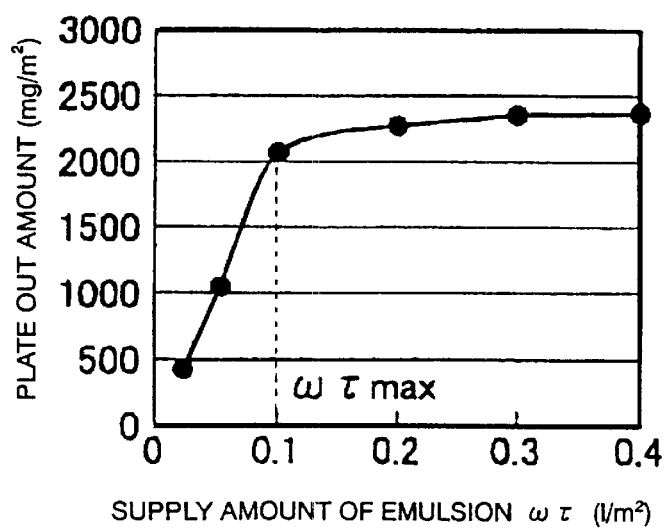
FIG. 6 is a graph showing the relationship between the supply amount of emulsion and the plate out amount.

FIG. 6 shows the relationship between the supply amount of emulsion and the plate out amount, determined by conducting a plate out test under the conditions given in Table 4.

TABLE 4

| Base oil | Beef tallow |
|---|---|
| Concentration of emulsion | 10% |
| Average particle diameter of emulsion | 20 μm |
| Flow rate of emulsion | 0.1 l/m² |
| Spray pressure | 2 kg/cm² |
| Nozzle type | Flat nozzle |
| Steel sheet-to-nozzle distance | 110 mm |
| Temperature of steel sheet | 150° C. |
| Phase inversion time | 0.1 sec |

The plate out amount saturates at a certain supply amount of emulsion, and the sticking efficiency decreases. Therefore, it is desirable that the supply amount of emulsion be set in the range in which the plate out amount does not saturate. Taking the flow rate density as $\omega$ (l/m²) and the spray retention time as $\tau$ (min), the supply amount of emulsion is expressed as m. Taking the supply amount of emulsion at the time when the plate out amount saturates as $\omega\tau max$ (l/m²), the following equation (3) is obtained. From FIG. 6, it can be seen that $\omega\tau max$ is about 0.1 l/m².

$$\omega\tau \geq \omega\tau max \qquad (3)$$

The flow rate Q (l/min) per one spray header of a rolling mill is calculated by $Q=(\omega\tau) \times W \times V$, where W (m) is the width of spray, and V (m/min) is the rolling speed. When W=1.2 m and V=1800 mpm, Q is 250 l/min. Therefore, the flow rate per one spray header may be 215 l/min at the maximum.

In the range in which the plate out amount does not saturate, the plate out amount $P\phi$ is calculated by the following equation (4).

$$P\phi = k \times (c/100) \times \omega\tau \times (f/100) \qquad (4)$$

where, c is the concentration (%) of emulsion, f is the sticking efficiency (%), and k is a unit conversion factor (mg/l). The factor k, although differing depending on the type of oil, is about 0.89 to 0.90×10⁶.

As shown in FIG. 3, the sticking efficiency f decreases with an increase in the concentration c of emulsion, so that the concentration c of emulsion is made as low as possible. As shown in FIG. 1, the sticking efficiency f is affected by the average particle diameter d (μm) of emulsion, so that the relationship between the sticking efficiency f, the concentration c and the average particle diameter d is expressed by the following equation (5).

$$f = F(c, d) \qquad (5)$$

where the F is a certain function.

The following equation (6) is obtained from the equations (2), (4) and (5).

$$c \times F(c, d) \geq P\phi min/\omega\tau \times k \qquad (6)$$

Therefore, the concentration c and the average particle diameter d of emulsion of the second rolling oil supply system must satisfy the equation (6).

For example, in the case of emulsion having a sticking efficient f shown in FIG. 3, an example of calculation of the minimum concentration when the average particle diameter d is 20 $\mu$m is described below.

The minimum plate out amount P$\phi$min in the equation (6) is determined by the following procedure. First, the relationship between the occurrence of heat scratch and chattering and the quantity of oil sticking onto the steel sheet is investigated, and the lower limit value of the quantity of oil sticking onto the steel sheet at the time when neither heat scratch nor chattering occurs is taken as P1min (mg/m$^2$). At this time, the plate out amount P$\phi$min on the steel sheet surface on the entrance side of the rolling mill is calculated by P$\phi$min=2×P1min/(1−r) assuming that rolling oil of the same quantity as the quantity of oil sticking onto the steel sheet sticks onto the surface of roll on the delivery side of the rolling mill as well. In this calculation, r denotes a reduction rate at the time of rolling.

When the P1min is 300 mg/m$^2$ and the r is 0.3, P$\phi$min is 860 mg/m$^2$. When the supply amount $\omega\tau$ of emulsion is 30% of $\omega\tau$max, the minimum concentration of emulsion satisfying the equation (6) is determined to be 10.0% by using the relationship between the concentration c and the sticking efficiency f of emulsion at the time when the average particle diameter d is 20 $\mu$m shown in FIG. 3.

On the other hand, in the case where the above-described emulsion is used as emulsion for the conventional rolling oil supply system in a recirculation mode, shearing is applied sufficiently to make the average particle diameter smaller than 20 $\mu$m, by which emulsion having stable emulsifying dispersibility is provided, and the concentration is made about 1.0 to 5.0%.

As seen in this example, considering the conditions in the above-described equations (2) to (6), the concentration of emulsion of the second rolling oil supply system is higher than that in the case of the rolling oil supply system in a recirculation mode.

The spray pressure of rolling oil at the time when emulsion is supplied is preferably 0.5 to 7 kg/cm$^2$. The pressure of 0.5 kg/cm$^2$ is the minimum pressure for emulsion supplied from the spray header for spraying the back surface of steel sheet to reach the front surface of steel sheet. If the spray pressure exceeds 7 kg/cm$^2$, the quantity of emulsion that collides with the front surface of steel sheet and scatters increases, so that the sticking efficiency decreases.

Figure 7:
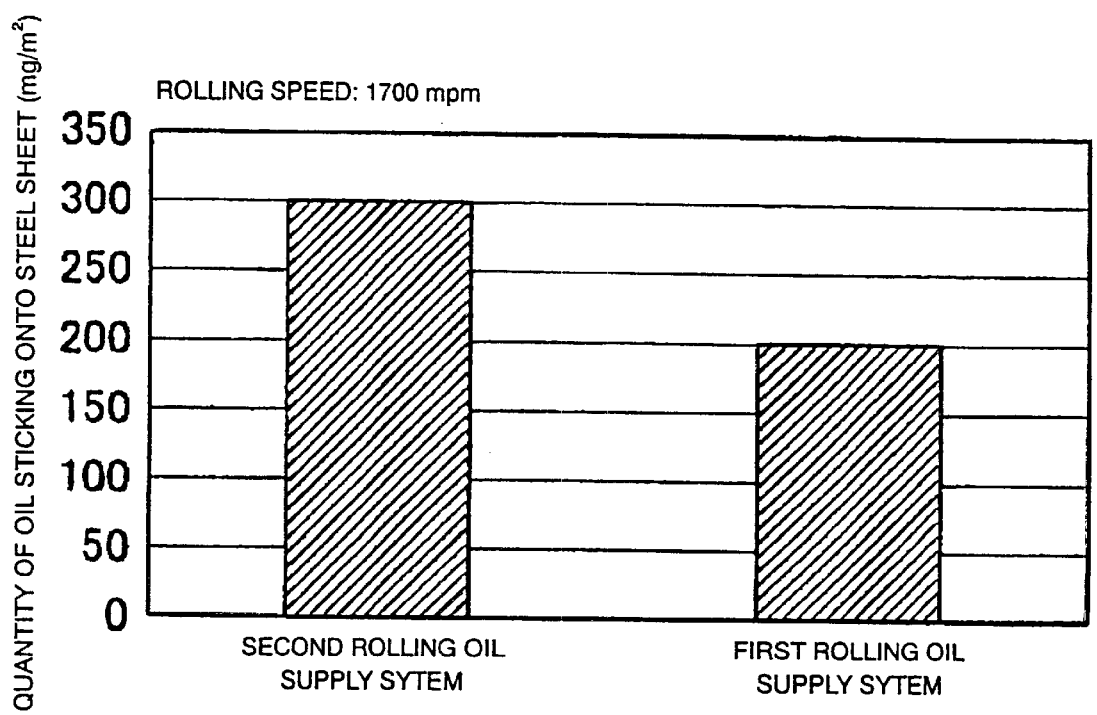
FIG. 7 is a graph showing the difference of quantity of oil sticking onto a steel sheet between the method in accordance with the present invention and the conventional method.

Actually, the quantity of oil sticking onto the steel sheet in the method in accordance with the present invention and the conventional method for supplying rolling oil in a recirculation mode was measured by the solvent extraction process by setting the concentration of emulsion at 3.5%, the average particle diameter thereof at 10 $\mu$m, and the supply amount of emulsion from the upper and lower spray headers at 4000 l/min in the first rolling oil supply system, and setting the concentration of emulsion at 10%, the average particle diameter thereof at 20 $\mu$m, and the supply amount of emulsion from the upper and lower spray headers at 130 l/min in the second rolling oil supply system. As a result, as shown in FIG. 7, the quantity of oil sticking onto the steel sheet measured by the method in accordance with the present invention was about 40% larger than that measured by the conventional method. This means that the sticking efficiency is about 12 times that of the conventional method.

In the first rolling oil supply system for supplying emulsion rolling oil in a recirculation mode, rolling oil and water that are brought to the outside of the system in a state of sticking onto the steel sheet or are lost by evaporation, leaking, or scum-out are replenished, so that the liquid quantity and concentration of emulsion in the tank are kept constant.

On the other hand, the emulsion included in the tank of the first rolling oil supply system from the second rolling oil supply system has a higher concentration than that of the emulsion of the first rolling oil supply system, but the type and the concentration with respect to the amount of oil of emulsifier are the same. Therefore, the emulsion can be used as make-up oil.

Thereupon, in the case where the quantity of rolling oil included in the tank of the first rolling oil supply system from the second rolling oil supply system is larger than the amount of oil loss of the first rolling oil supply system, it is more desirable that the tank of the first rolling oil supply system be replenished with dilution water because the concentration of emulsion can be kept constant. At this time, the liquid quantity of emulsion in the tank increases while the concentration is kept constant, which is equivalent to the compensation of oil loss amount provided in advance.

In the case where the quantity of rolling oil included in the tank of the first rolling oil supply system from the second rolling oil supply system is smaller than the amount of oil loss of the first rolling oil supply system, it is more desirable that the tank of the first rolling oil supply system be replenished with the emulsion in the tank of the second rolling oil supply system as well as dilution water because the concentration of emulsion can be kept constant.

The replenishment amount W (l/min) of dilution water and the replenishment amount q2 (l/min) of emulsion of the second rolling oil supply system are determined based on the following equations (8) to (12) according to the oil increase amount $\Delta Qo$ (l/min) expressed by the following equation (7) in which the amount of oil loss of the first rolling oil supply system is subtracted from the oil quantity of emulsion of the second rolling oil supply system included in the first rolling oil supply system in a recirculation mode.

$$\Delta Qo=(c/100)\times(1-f/100)\times q1-Qlo \qquad (7)$$

$$\Delta Qw=(1-c/100)\times q-Qlw \qquad (8)$$

When $\Delta Qo \geq 0$, $$W=(100/c-1)\times\Delta Qo-\Delta Qw \qquad (9)$$

When $\Delta Qo<0$ and $\Delta QE<0$, $$q2=\Delta Qo\times 100/c \qquad (10)$$

$$W=-\Delta Qo\times 100/co-q2-\Delta Qw \qquad (11)$$

When $\Delta Qo<0$ and $\Delta QE>0$, $$W=[(c/co-1)+c/100\times f/100\times(1-100/co)]\times q1 \qquad (12)$$

where, $\Delta Qw$ (l/min) is water increase amount of the first rolling oil supply system, Qlo (l/min) is oil loss amount of the first rolling oil supply system, Qlw (l/min) is water loss amount of the first rolling oil supply system, $\Delta QE$ (l) is deviation from a fixed level of liquid quantity of emulsion in the tank, q1 (l/min) is supply amount of emulsion from the second rolling oil supply system to a steel sheet, and co (%) is concentration of emulsion of the first rolling oil supply system.

By using such a replenishment method, the emulsion of the second rolling oil supply system can be utilized effectively including the use for replenishment of insufficient oil in the first rolling oil supply system, so that the unit consumption of rolling oil can be decreased as in the conventional rolling oil supplying method in a recirculation mode. Also, in the case where lubrication and cooling are effected by the first rolling oil supply system only as well, the second rolling oil supply system can be used to compensate the oil loss amount of the first rolling oil supply system. At this time, the replenishment amount of emulsion and dilution water in the second rolling oil supply system is determined based on the equations (10) and (11) assuming that $\Delta Qo=-Qlo$ and $\Delta Qw=-Qlw$.

EXAMPLE 1

Figure 8:
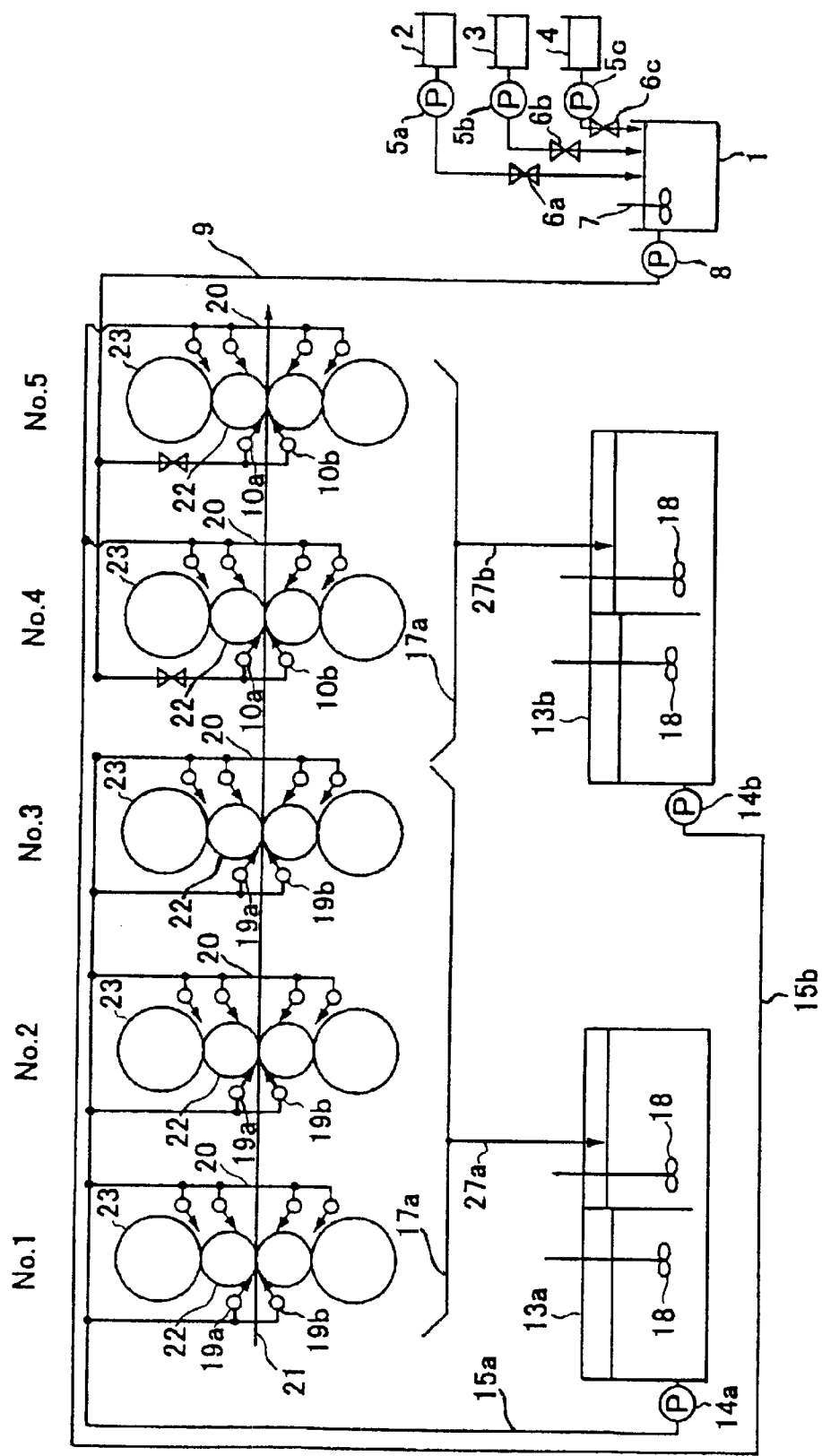
FIG. 8 is a schematic diagram showing one example of a method for supplying rolling oil for cold rolling in accordance with the present invention.

FIG. 8 shows one example of a method for supplying rolling oil for cold rolling in accordance with the present invention.

In this method, the fourth and fifth mill stands of a cold tandem mill, which consists of a total of five mill stands having the first rolling oil supply system in a conventional recirculation mode, are provided with the second rolling oil supply system. The lubrication and cooling of the first to third mill stands are accomplished by the first rolling oil supply system, the lubrication of the fourth and fifth mill stands is accomplished by the second rolling oil supply system, and the cooling of the fourth and fifth mill stands is accomplished by the first rolling oil supply system. The reason for the provision of the second rolling oil supply system at the fourth and fifth mill stands is that as described above, at the downstream mill stands, the rolling speed is higher and moreover the rolling load is higher because the sheet thickness is small, so that lubrication is liable to become insufficient.

Hot water, stock oil for rolling oil, and an emulsifier are supplied from respective tanks 2, 3 and 4 to an emulsion tank 1 through supply pumps 5a, 5b and 5c while the replenishment amount is controlled by flow regulating valves 6a, 6b and 6c so that a predetermined oil concentration or concentration with respect to the amount of oil is provided. The concentration of emulsion in the tank 1 is 4 to 15%. and the concentration of emulsifier with respect to the amount of oil is equal to that in the first rolling oil supply system. The average particle diameter in the tank 1 is controlled so as to be 30 to 50 $\mu$m by the rotational speed of an agitator 7. The temperature of emulsion is equal to that in the first rolling oil supply system.

The emulsion of the second rolling oil supply system is supplied to the front and back surface of a steel sheet 21 through spray headers 10a and 10b by a pump 8 after passing through a rolling oil supply line 9. The average particle diameter of emulsion at this time is decreased to 20 to 40 $\mu$m by shearing at the pump 8 and the nozzle of the spray headers 10a and 10b. The supply amount is set at 215 l/min at the maximum per one spray header, and is controlled according to the size and type of steel sheet.

Emulsion that does not stick onto the steel sheet 21 after being sprayed on the steel sheet 21 is recovered by a recovery oil pan 17b together with emulsion recirculating for cooling, and is sent to a tank 13b of the first rolling oil supply system through a return line 27b. Thereafter, the emulsion is agitated by an agitator 18 provided in the tank 13b, and is pulverized finer to the same particle diameter as that of the emulsion of the first rolling oil supply system, by which emulsion having stable emulsifying dispersibility is provided.

Figure 9:
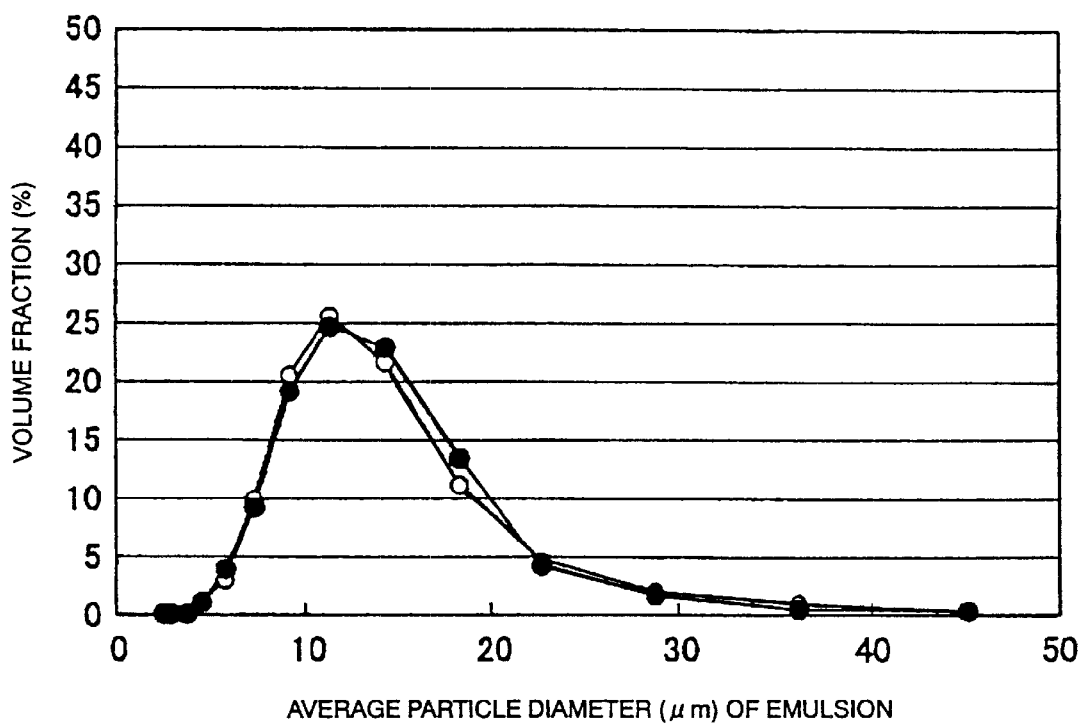
FIG. 9 is a graph showing the particle diameter distribution of emulsion in a tank of a first rolling oil supply system.

FIG. 9 shows the particle diameter distribution of emulsion in the tank 13b of the first rolling oil supply system in the case where the second rolling oil supply system is used (●) and in the case where it is not used (○).

The particle diameter distribution of emulsion in the tank 13b in the case where the second rolling oil supply system is used coincides with that in the case where it is not used, and thus the emulsifying dispersibility of the first rolling oil supply system is maintained.

The emulsion of the first rolling oil supply system is stored in a tank 13a for the first to third mill stands and the tank 13b for the fourth and fifth mil stands, and is agitated by the agitators 18, by which stable emulsion with small particle diameters is provided. The average particle diameter of emulsion is 8 to 15 $\mu$m when an emulsifier of a cationic dispersion type is used, and is sometimes 10 $\mu$m or smaller when an emulsifier other than the above-described type is used. Also, the concentration of emulsion is usually 1 to 4%. The temperature of emulsion is 55 to 70 ° C. when beef tallow is used as the base oil, and is sometimes lower than the above-described temperatures when synthetic ester based rolling oil is used. The emulsion in the tanks 13a and 13b is supplied to rolling oil supply lines 15a and 15b by means of pumps 14a and 14b.

At the first to third mill stands where lubrication is accomplished by the first rolling oil supply system, emulsion is sprayed from spray headers 19a and 19b toward a roll bite. The supply amount of emulsion is 1000 to 2000 l/min at each spray header. On the delivery side of each of the first to fifth mill stands, emulsion is sprayed from the cooling emulsion supply system 20 toward the steel sheet 21, a work roll 22, and a backup roll 23. The supply amount of emulsion is 1000 to 2000 l/min at each spray header. Subsequently, the emulsion is recovered by recovery oil pans 17a and 17b, and is returned to the tanks 13a and 13b through return lines 27a and 27b.

By the method in accordance with the present invention shown in FIG. 8, a base material for hard tin plate having a thickness of 1.8 mm and a width of 900 mm was rolled to a thickness of 0.18 mm and a base material for soft tin plate having a thickness of 2.3 mm and a width of 1000 mm was rolled to a thickness of 0.20 mm under the rolling oil supply conditions described below while the speed is changed, and the occurrence of chattering and heat scratch was investigated.

As the base oil of rolling oil, beef tallow (viscosity at 40° C.: 45 cSt) was used. As the emulsifier, a cationic emulsifier was used. The concentration with respect to the amount of oil and the temperature of emulsifier of emulsion of the second rolling oil supply system were set at 0.6% and 60° C., respectively, like the first rolling oil supply system, and the concentration of emulsion of the second rolling oil supply system was set at 10%. The particle diameter of emulsion subjected to shearing by the pump and header nozzle was set at 20 $\mu$m. The average particle diameter in the tank of the second rolling oil supply system was set at 30 $\mu$m, and the supply amount of emulsion was set at 100 l/min at the fourth mill stand and at 130 l/min at the fifth mill stand. The lubrication of other mill stands and the cooling of all mill stands were accomplished by using emulsion having a concentration of 3.5% and an average particle diameter of 10 $\mu$m of the first rolling oil supply system.

For comparison, the same investigation was also conducted in the case where rolling was carried out by the conventional method in which the lubrication of the fourth and fifth mill stands is accomplished by the first rolling oil supply system. In this case, the supply amount of emulsion was set at 2500 l/min at the fourth mill stand and at 4000 l/min at the fifth mill stand.

As given in Table 5, when a base material for hard tin plate is rolled, by the method in accordance with the present invention, the rolling speed can be increased to 2100 mpm without the occurrence of chattering and heat scratch. On the other hand, by the conventional method, chattering occurs at a rolling speed of 1500 mpm, and the rolling speed cannot be increased further.

TABLE 5

| Supply method | Rolling speed (mpm) | | | | |
| --- | --- | --- | --- | --- | --- |
|  | 1300 | 1500 | 1700 | 1900 | 2100 |
| Method of invention | ○ | ○ | ○ | ○ | ○ |
| Conventional method | ○ | • | • | • | • |

Figure 10:
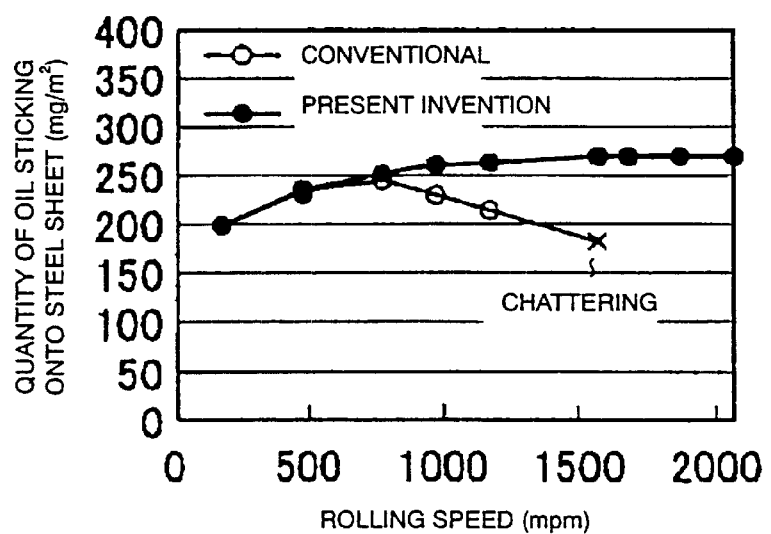
FIG. 10 is a graph showing the relationship between the rolling speed and the quantity of oil sticking onto a steel sheet in the case where a base material for hard tin plate is rolled.

○: Neither heat scratch nor chattering occurs
•-: Chattering occurs
•: Rolling is impossible FIG. 10 shows the relationship between the rolling speed and the quantity of oil sticking onto a steel sheet in the case where a base material for hard tin plate is rolled. The quantity of oil sticking onto a steel sheet is a value obtained by averaging the amounts on the surface and the back determined by the solvent extraction process.

By the method in accordance with the present invention, a constant quantity of oil sticking onto a steel sheet can be obtained steadily even at high speed rolling, but by the conventional method, the quantity of oil sticking onto a steel sheet decreases greatly when rolling is performed at a speed higher than 800 mpm.

Figure 11:
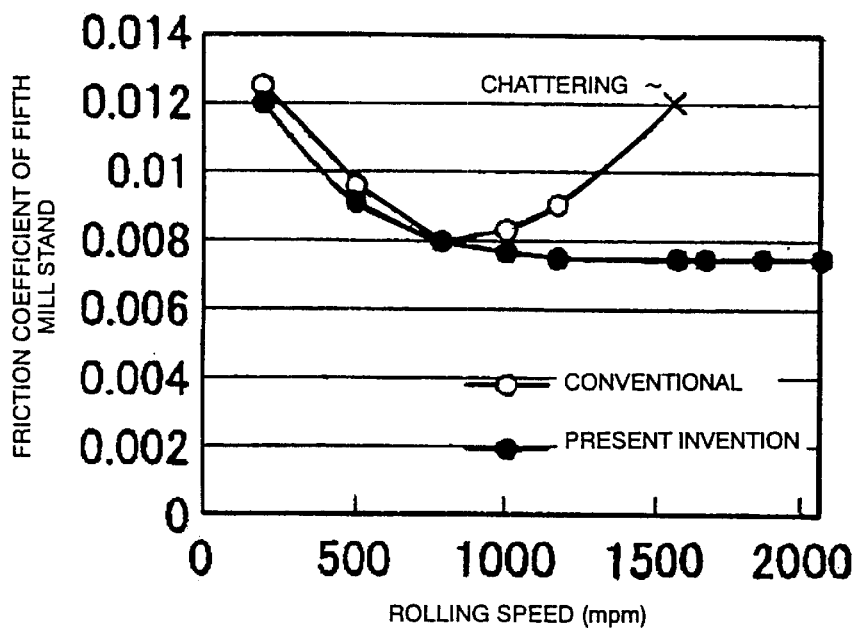
FIG. 11 is a graph showing the relationship between the rolling speed and the friction coefficient of a fifth mill stand in the case where a base material for hard tin plate is rolled.

FIG. 11 shows the relationship between the rolling speed and the friction coefficient of the fifth mill stand in the case where a base material for hard tin plate is rolled.

Corresponding to the result shown in FIG. 10, by the method in accordance with the present invention, the friction coefficient of the fifth mill stand does not increase, and thus a shortage of lubrication does not occur even at high speed rolling.

Figure 12:
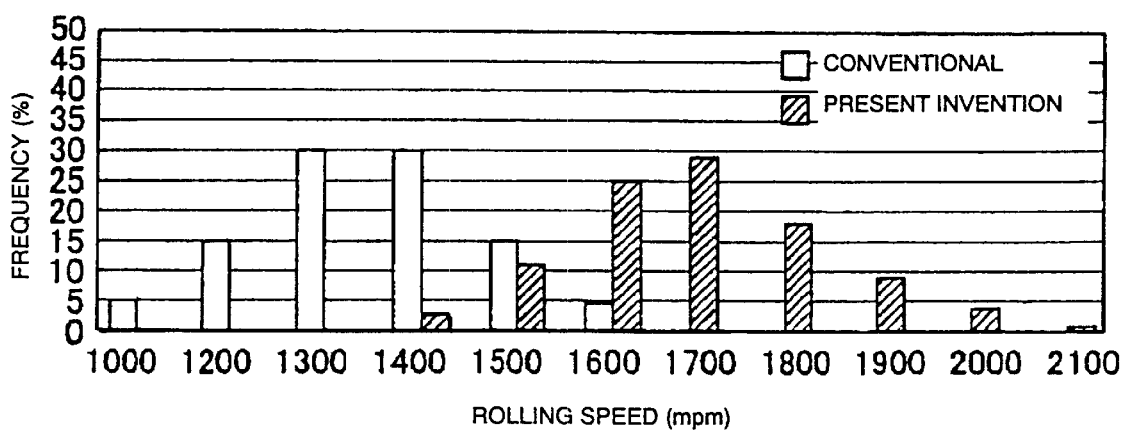
FIG. 12 is a graph showing the distribution of rolling speeds capable of rolling a base material for hard tin plate.

FIG. 12 shows the distribution of rolling speeds capable of rolling a base material for hard tin plate.

By the method in accordance with the present invention, the average rolling speed is 1700 mpm, which is a greatly improved value as compared with the average rolling speed of 1359 mpm in the conventional method.

Table 6 shows a result obtained when a base material for soft tin plate is rolled. By the method in accordance with the present invention, the rolling speed can be increased to 2100 mpm without the occurrence of heat. scratch. On the other hand, by the conventional method, a heat scratch occurs at a rolling speed of 1700 mpm, and the degree of heat scratch becomes remarkable when rolling is performed at a speed higher than 1700 mpm.

TABLE 6

| Supply method | Rolling speed (mpm) | | | | |
| --- | --- | --- | --- | --- | --- |
|  | 1300 | 1500 | 1700 | 1900 | 2100 |
| Method of invention | ○ | ○ | ○ | ○ | ○ |
| Conventional method | ○ | ○ | Δ | • | • |

○: Neither heat scratch nor chattering occurs
Δ: Slight chattering occurs
•: Remarkable heat scratch occurs FIG. 13 shows the relationship between the rolling speed and the quantity of oil sticking onto a steel sheet in the case where a base material for soft tin plate is rolled.

By the method in accordance with the present invention, a constant quantity of oil sticking onto a steel sheet can be obtained steadily even at high speed rolling, but by the conventional method, the quantity of oil sticking onto a steel sheet decreases greatly when rolling is performed at a speed higher than 800 mpm.

Figure 14:
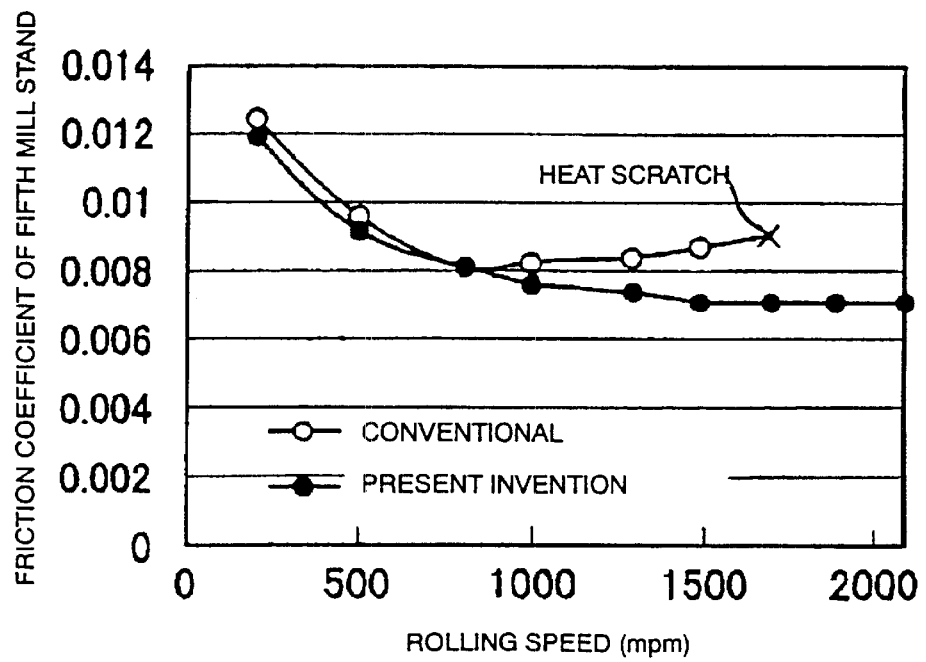
FIG. 14 is a graph showing the relationship between the rolling speed and the friction coefficient of a fifth mill stand in the case where a base material for soft tin plate is rolled.

FIG. 14 shows the relationship between the rolling speed and the friction coefficient of the fifth mill stand in the case where a base material for soft tin plate is rolled.

Figure 13:
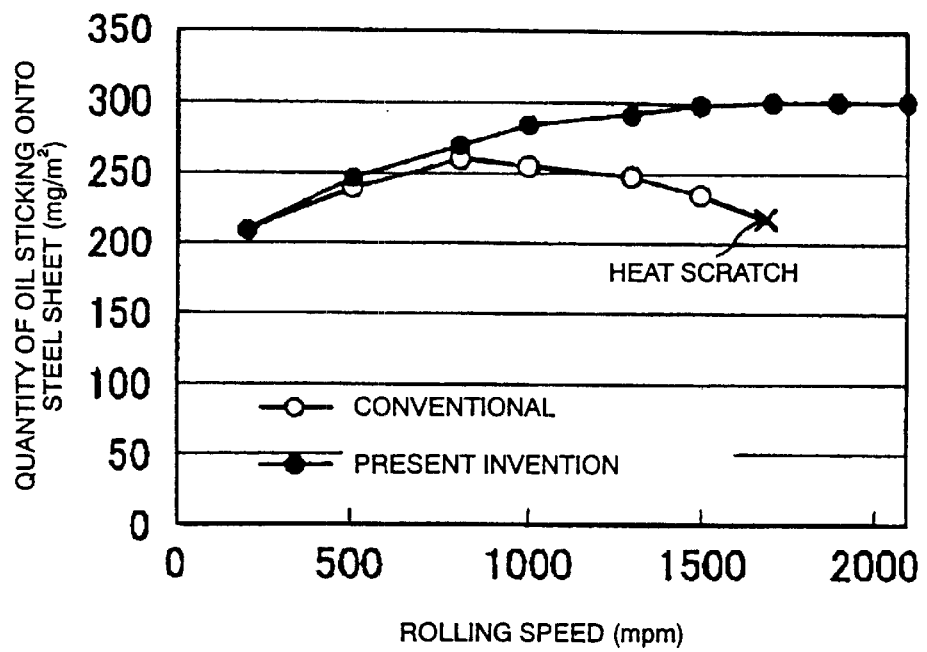
FIG. 13 is a graph showing the relationship. between the rolling speed and the quantity of oil sticking onto a steel sheet in the case where a base material for soft tin plate is rolled.

Corresponding to the result shown in FIG. 13, by the method in accordance with the present invention, the friction coefficient of the fifth mill stand does not increase, and thus a shortage of lubrication does not occur even at high speed rolling.

Figure 15:
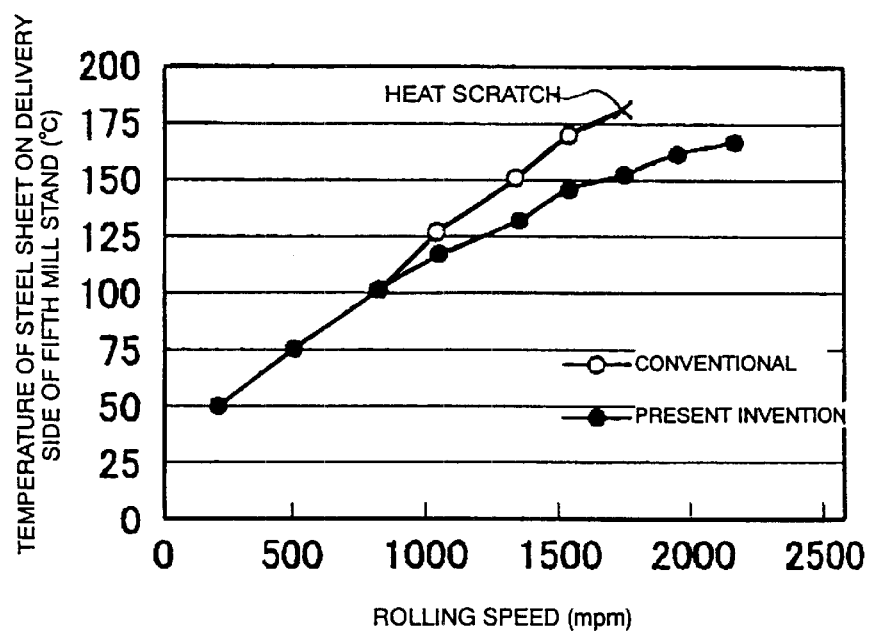
FIG. 15 is a graph showing the relationship between the rolling speed and the temperature of a steel sheet on the delivery side of a fifth mill stand in the case where a base material for soft tin plate is rolled.

FIG. 15 shows the relationship between the rolling speed and the temperature of a steel sheet on the delivery side of the fifth mill stand in the case where a base material for soft tin plate is rolled.

By the method in accordance with the present invention, the rise in temperature is restrained when rolling is performed at a high speed as compared with the conventional method, which result coincides with the above-described result that heat scratch is less liable to occur. The reason for this is that as shown in FIG. 14, the increase in the friction coefficient is restrained in the method in accordance with the present invention.

Figure 16:
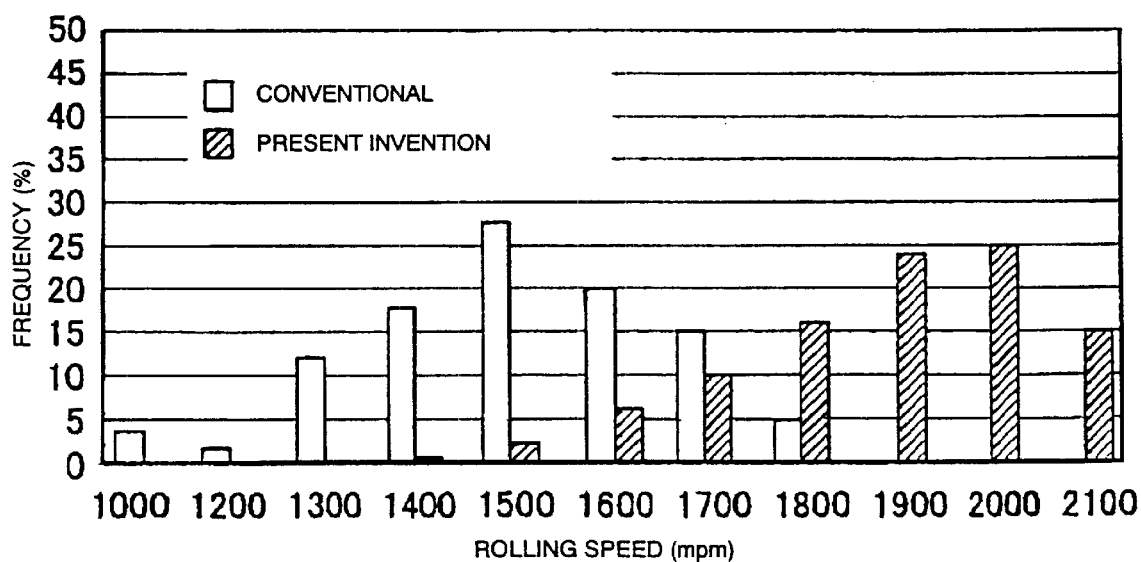
FIG. 16 is a graph showing the distribution of rolling speeds capable of rolling a base material for soft tin plate.

FIG. 16 shows the distribution of rolling speeds capable of rolling a base material for soft tin plate.

By the method in accordance with the present invention, the average rolling speed is 1900 mpm, which is a greatly improved value as compared with the average rolling speed of 1550 mpm in the conventional method.

EXAMPLE 2

Figure 17:
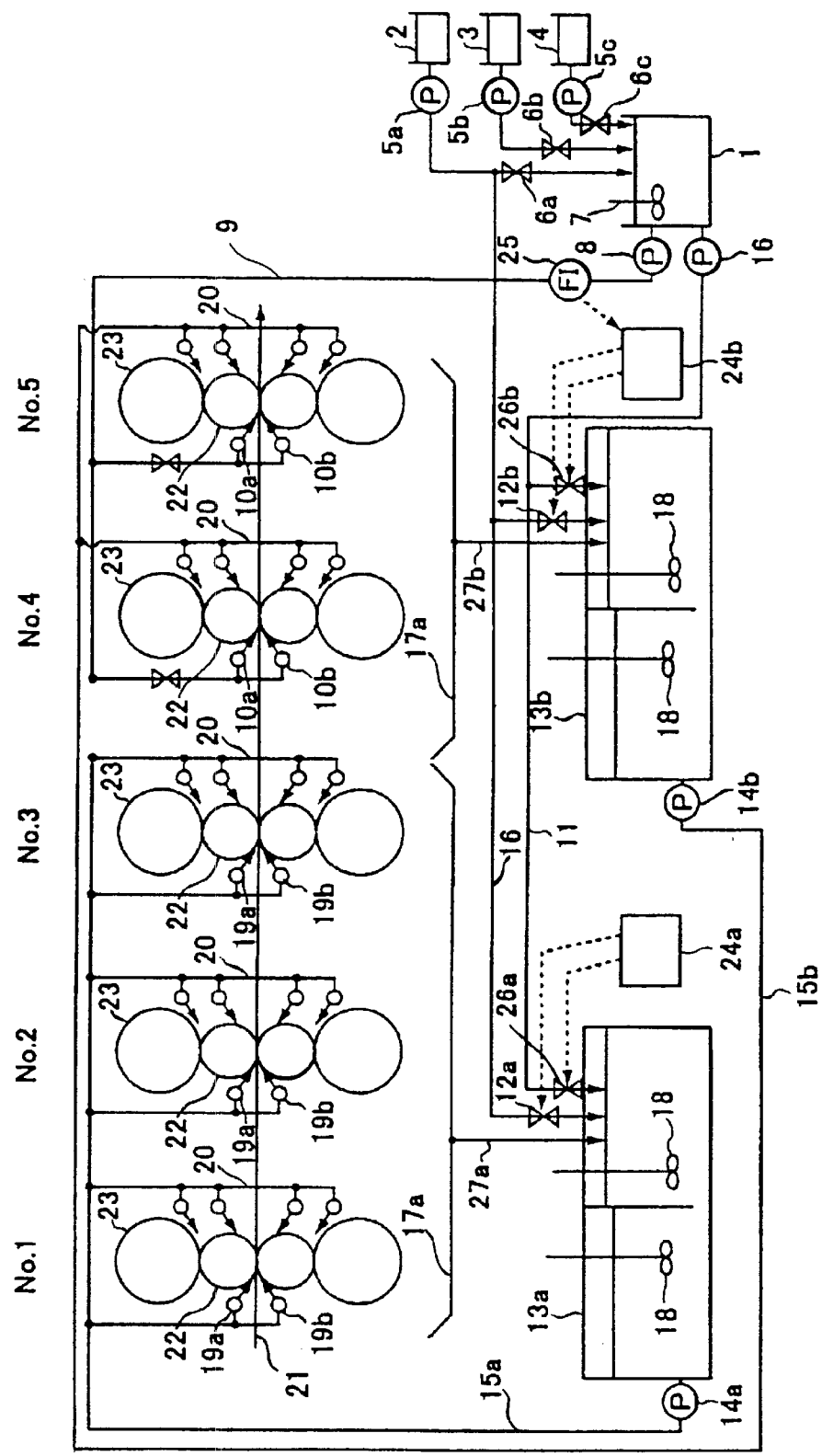
FIG. 17 is a schematic diagram showing another example of a method for supplying rolling oil for cold rolling in accordance with the present invention.

FIG. 17 shows another example of a method for supplying rolling oil for cold rolling in accordance with the present invention.

In this method, a rolling oil supply line 11 is additionally provided in the method shown in FIG. 8 so that emulsion can be supplied from the second rolling oil supply system to the tanks 13a and 13b of the first rolling oil supply system. Also, a dilution water supply line 16 is provided so that dilution water can be resupplied from the hot water tank 2 to the tanks 13a and 13b of the first rolling oil supply system.

A calculating device 24b calculates the supply amount of emulsion supplied from the tank 1 of the second rolling oil supply system to the tank 13b of the first rolling oil supply system and the replenishment amount of dilution water.

Figure 18:
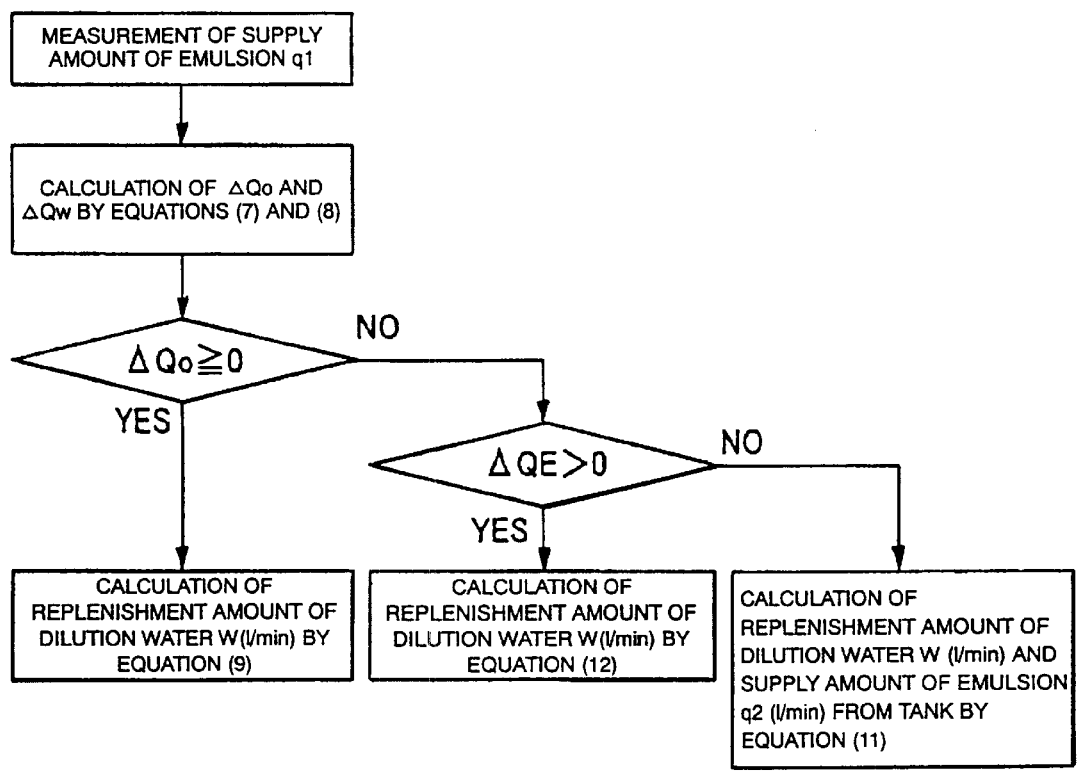
FIG. 18 is a flowchart for calculating the replenishment amount of emulsion and dilution water.

FIG. 18 is a flowchart for the calculation. The supply amount q1 of emulsion sprayed at the fourth and fifth mill stands from the second rolling oil supply system is measured with a flowmeter 25. The supply amount q2 of emulsion supplied from the tank 1 and the replenishment amount W of dilution water are calculated using the above-described equations (7) to (12). Based on the calculation result, flow control valves 12b and 26b are regulated.

For example, when the concentration of emulsion of the first rolling oil supply system for the fourth and fifth mill stands is 2.5%, the oil loss amount and the water loss amount are 1.4 l/min and 18.4 l/min, respectively, the concentration of emulsion in the tank 1 of the second rolling oil supply system is 10%, and the sticking efficiency of emulsion is 30%, assuming that the supply amounts of emulsion supplied to a steel sheet are 20 l/min and 30 l/min at the fourth and fifth mill stands, respectively, the oil increase amount of the first rolling oil supply system $\Delta Qo$ is 2.1 l/min according to the equation (7), which means that $\Delta Qo>0$. Thus, only dilution water is resupplied to keep the concentration of the first rolling oil supply system fixed. The replenishment amount W of dilution water is determined to be 55.3 l/min by the equation (9). Also, assuming that the supply amounts of emulsion supplied to a steel sheet are 5 l/min and 13 l/min at the fourth and fifth mill stands, respectively, the oil increase amount of the first rolling oil supply system $\Delta Qo$ is $-0.14$ l/min according to the equation (7), which means that $\Delta Qo<0$. Thus, the supply of rolling oil to the first rolling oil supply system is needed. When the liquid quantity of emulsion in the tank of the first rolling oil supply system is kept constant ($\Delta QE=0$), emulsion of the second rolling oil supply system and dilution water are supplied. From the equations (10) and (11), the supply amount q2 of emulsion and the replenishment amount of dilution water are determined to be 1.4 l/min and 6.4 l/min, respectively.

When the liquid quantity of emulsion in the tank is larger than the fixed level ($\Delta QE>0$), only dilution water is replenished. The replenishment amount W of dilution water is determined to be 33.0 l/min by the equation (12).

A calculating device 24a calculates the supply amount of emulsion supplied from the tank 1 of the second rolling oil supply system to the tank 13a of the first rolling oil supply system and the replenishment amount of dilution water. The supply amount q2 of emulsion supplied from the tank 1 and the replenishment amount W of dilution water are calculated using the equations (10) to (11), and based on the calculation result, flow control valves 12a and 26a are regulated. Thereby, the oil in the tank 13a of the first rolling oil supply system is replenished.

For example, when the concentration of emulsion of the first rolling oil supply system for the first to third mill stands is 2.5%, the oil loss amount and the water loss amount are 0.6 l/min and 7.9 l/min, respectively, the concentration of emulsion in the tank 1 of the second rolling oil supply system is 10%, and the sticking efficiency of emulsion is 30%, the replenishment amount W of dilution water is 25.9 l/min and the supply amount q2 of emulsion supplied from the second rolling oil supply system is 6 l/min.

By the method in accordance with the present invention shown in FIG. 17, a base material for tin plate with a thickness of 1.8 to 2.0 mm and a width of 800 to 1200 mm was rolled to a thickness of 0.16 to 0.25 mm under the rolling oil supply conditions described below, and the unit consumption of rolling oil was investigated.

As the base oil of rolling oil, beef tallow (viscosity at 40° C.: 45 cSt) was used. As the emulsifier, a cationic emulsifier was used. The concentration of emulsion of the second rolling oil supply system was set at 10%, and the average particle diameter thereof was set at 20 μm. The concentration of emulsion of the first rolling oil supply system was set at 3%, and the average particle diameter thereof was set at 9 μm. The temperatures of emulsion of the first and second rolling oil supply systems and the concentrations of emulsifiers with respect to the amount of oil were set equal to each other, being 60° C. and 0.6%, respectively. At this time, the supply amount of emulsion supplied from the second rolling oil supply system was changed according to the post-rolling thickness. The supply amounts at the fourth and fifth mill stands were set at 100 l/min and 130 l/min, respectively, when the sheet thickness is 0.16 to 0.20 mm, and at 5 l/min and 13 l/min, respectively, when the sheet thickness is 0.20 to 0.25 mm.

For comparison, the same investigation was also conducted in the case where rolling was carried out by the conventional method in which the lubrication of the fourth and fifth mill stands is accomplished by the first rolling oil supply system. In this case, the supply amount of emulsion was set at 3000 l/min at the 4 fourth mill stand and at 4000 l/min at the fifth mill stand.

As given in Table 7, in the method in accordance with the present invention, the unit consumption of rolling oil can be decreased as compared with the conventional method. The reason for this is that in the method in accordance with the present invention, the emulsion of the second rolling oil supply system can be utilized effectively as make-up oil for the compensation of oil loss of the first rolling oil supply system, and the supply amount of emulsion can be decreased as compared with the conventional method, so that the amount of oil loss due to fume etc. can be decreased.

TABLE 7

| Supply method | Unit consumption of rolling oil (l/ton) |
| --- | --- |
| Method of invention | 0.55 |
| Conventional method | 0.7 |

Figure 19A:
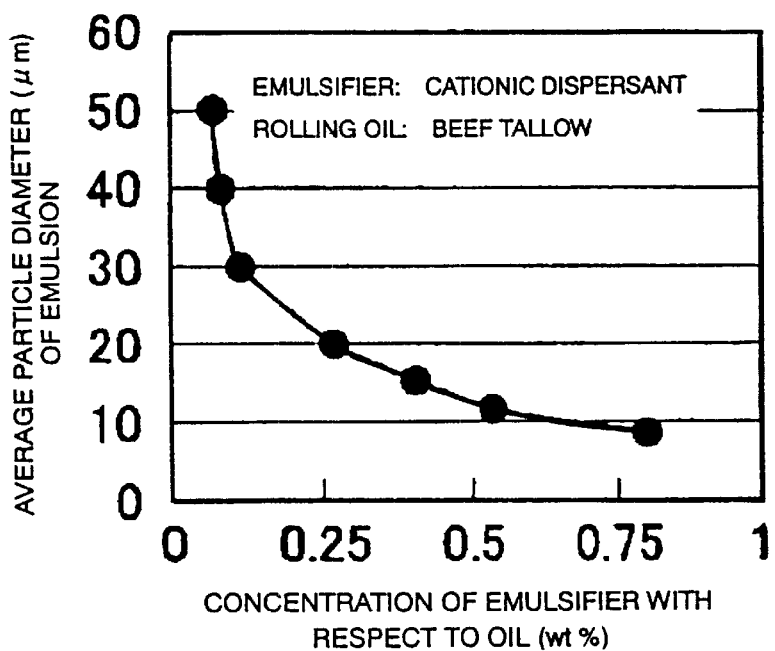
FIGS. 19A and 19B are graphs showing the relationship between the concentration of ane mulsifier with respect to oil and the average particle diameter of emulsion.
Figure 19B:
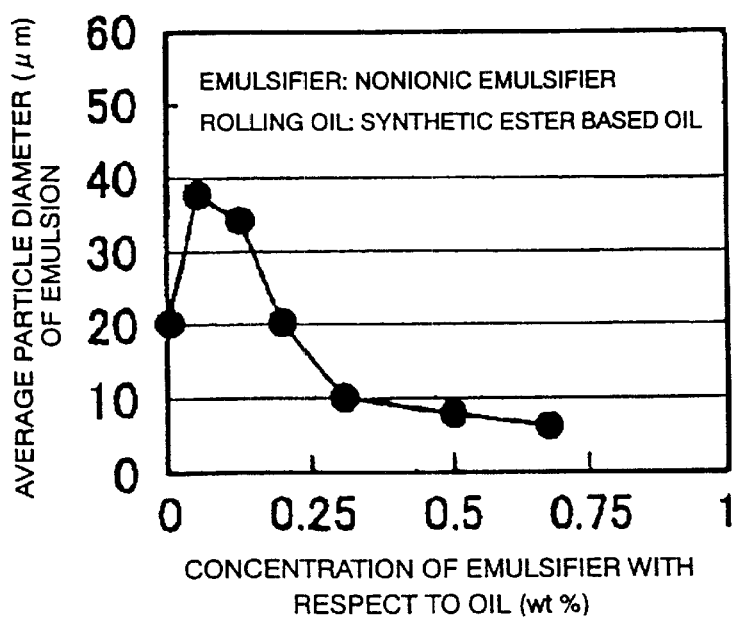

FIGS. 19A and 19B show the relationship between the concentration of an emulsifier with respect to the amount of oil and the average particle diameter of emulsion. FIG. 19A shows an example in which beef tallow is used as rolling oil and a cationic dispersant is used as an emulsifier. FIG. 19B shows an example in which synthetic ester based oil is used as rolling oil and a nonionic emulsifier is used as an emulsifier. The emulsion is fully subjected to mechanical agitation and shearing.

In both cases, the average particle diameter of emulsion increases as the concentration of emulsifier with respect to the amount of oil decreases. Also, since the sticking efficiency of emulsion increases with increasing average particle diameter of emulsion as shown in FIG. 1, the decrease in the concentration of emulsifier with respect to the amount of oil increases the sticking efficiency of emulsion, thereby improving the lubricating ability.

Therefore, if a first rolling oil supply system for supplying emulsion rolling oil to the roll and a steel sheet being rolled and a second rolling oil supply system for supplying emulsion rolling oil to the front and back surface of a steel sheet being rolled only are provided, and an emulsifier with a concentration with respect to the amount of oil lower than that of the emulsifier of the first rolling oil supply system is added and emulsion with an average particle diameter larger than that of the emulsion of the first rolling oil supply system, preferably 20 μm or larger, is supplied, outstanding lubricating ability can be obtained as in the first embodiment.

However, in order to maintain the stability of emulsifying dispersion of the first rolling oil supply system, it is necessary that emulsion be recovered before the emulsion of the second rolling oil supply system that has not stuck onto a steel sheet being rolled is joined to the emulsion of the first rolling oil supply system, an emulsifier of the same type as that of the first rolling oil supply system be added so as to have the same concentration with respect to the amount of oil as that of the first rolling oil supply system, and mechanical agitation be applied. By doing this, the emulsion of the second rolling oil supply system is pulverized finer to the same particle diameter as that of the emulsion of the first rolling oil supply system, by which emulsion having stable emulsifying dispersibility is provided.

At this time, the quantity qe (l/min) of the added emulsifier is determined based on the following equation (13).

$$qe = q1 \times (1-f/100) \times c/100 \times (ceo-ce)/100 \tag{13}$$

where, ceo (%) is concentration with respect to the amount of oil of the emulsifier of the first rolling oil supply system, and ce (%) is concentration with respect to the amount of oil of the emulsifier of the second rolling oil supply system.

The emulsifier can be added and agitated by the following method:

(1) A method in which the emulsifier is put in the tank of the first rolling oil supply system, and the rotational speed of the agitator in the tank is increased, by which emulsion is agitated.

(2) A method in which the emulsifier is put at a halfway position of a return pipe running from the oil pan for recovering emulsion to the tank of the first rolling oil supply system, and an orifice and an agitation pump are provided at a halfway position of pipe to agitate emulsion.

(3) A method in which the emulsifier is put in the oil pan for recovering emulsion, and an orifice and an agitation pump are provided at a halfway position of a return pipe running from the oil pan to the tank of the first rolling oil supply system to agitate emulsion.

(4) A method in which a buffer tank for recovery is provided apart from the tank of the first rolling oil supply system, and in the buffer tank, the emulsifier is added to the recovered emulsion, and an agitator is provided to agitate emulsion.

The emulsion recovered after being sprayed on a steel sheet from the second rolling oil supply system has a concentration higher than that of the emulsion of the first rolling oil supply system, and the emulsifier is added so that the concentration of emulsifier with respect to the amount of oil and the average particle diameter of emulsion are equal to those in the case of the first rolling oil supply system, so that the recovered emulsion can be used as make-up oil.

Therefore, in the case where the quantity of oil included in the tank of the first rolling oil supply system from the second rolling oil supply system is larger than the amount of oil loss of the first rolling oil supply system, it is preferable that the tank of the first rolling oil supply system be replenished with dilution water because the concentration of emulsion can be kept constant. At this time, the liquid quantity of emulsion in the tank increases while a fixed concentration is kept, which is equivalent to the compensation of oil loss amount provided in advance.

In the case where the quantity of oil included in the tank of the first rolling oil supply system from the second rolling oil supply system exceeds the amount of oil loss of the first rolling oil supply system and the liquid quantity of emulsion in the tank exceeds a fixed level, the concentration of emulsion can be kept constant merely by replenishing dilution water.

On the other hand, in the case where the quantity of oil included in the tank of the first rolling oil supply system from the second rolling oil supply system is smaller than the amount of oil loss of the first rolling oil supply system and the liquid quantity of emulsion in the tank does not exceed a fixed level, the concentration of emulsion can be kept constant by replenishing the tank of the first rolling oil supply system with the emulsion of the second rolling oil supply system, to which the emulsifier is added so that the concentration of emulsifier with respect to the amount of oil is equal to that of the emulsion of the first rolling oil supply system, as well as dilution water.

At this time, the quantity qe of the added emulsifier is expressed by the following equation (14).

$$qe = q2 \times c/100 \times (ceo-ce)/100 \tag{14}$$

The concentration, supply amount, and replenishment amount of emulsion of the second rolling oil supply system and the replenishment amount of dilution water are determined in the same way as in the first embodiment.

EXAMPLE 3

Figure 20:
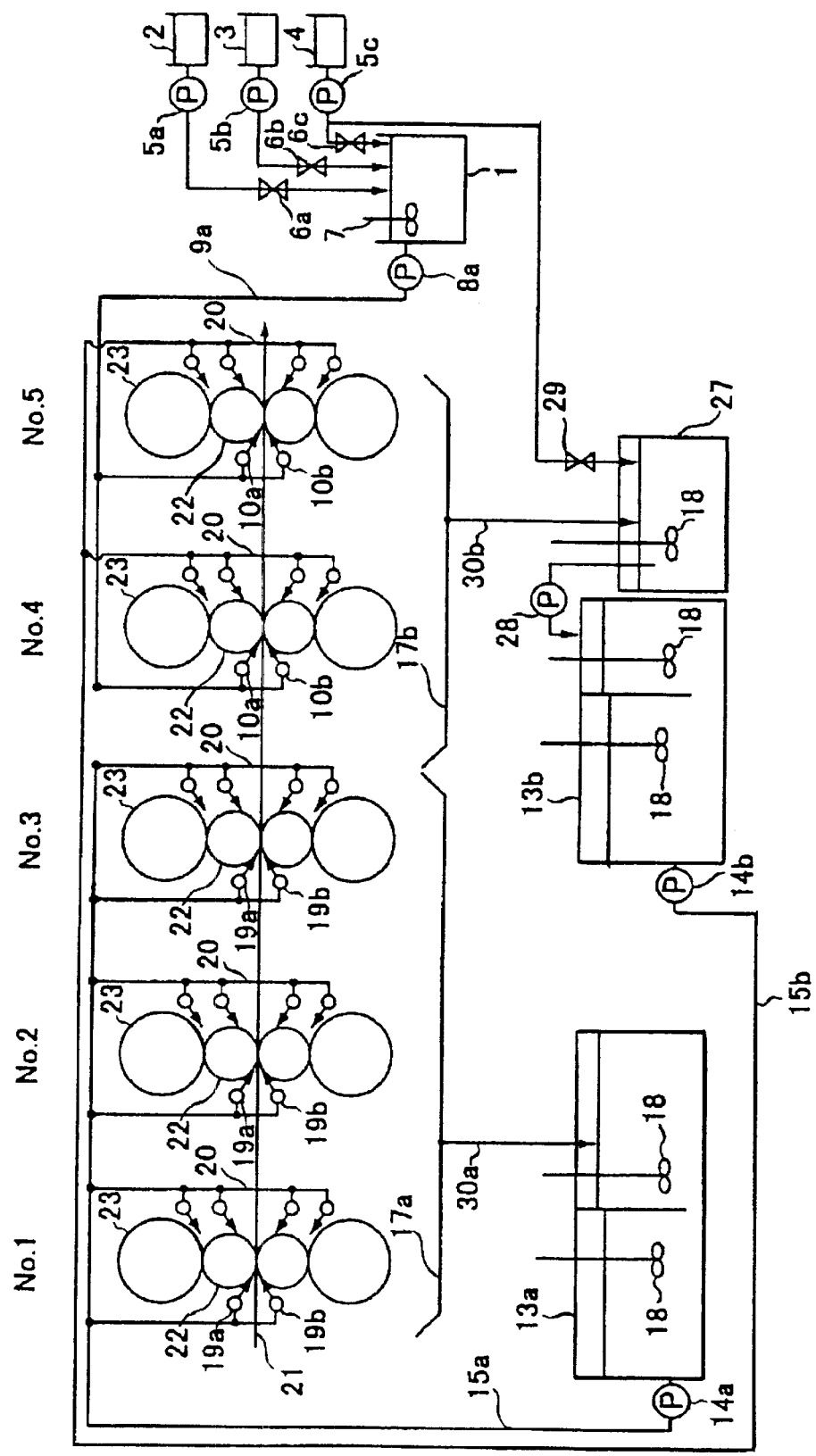
FIG. 20 is a schematic diagram showing still another example of a method for supplying rolling oil for cold rolling in accordance with the present invention.

FIG. 20 shows still another example of a method for supplying rolling oil for cold rolling in accordance with the present invention. In this figure, as in the case of FIG. 8, the fourth and fifth mill stands of a cold tandem mill, which consists of a total of five mill stands having the first rolling oil supply system in a recirculation mode, are provided with the second rolling oil supply system.

In the example shown in FIG. 20, the emulsion of the second rolling oil supply system to which an emulsifier with a low concentration with respect to the amount of oil is added, which has not stuck onto the steel sheet 21, is recovered into an agitation tank 27 before it is joined to the emulsion of the first rolling oil supply system. In the agitation tank 27, an emulsifier is added so that the concentration thereof with respect to the amount of oil is equal to that of the emulsifier of the first rolling oil supply system, and the emulsion is agitated. Specifically, the emulsion that has not stuck onto the steel sheet 21 is recovered into the agitation tank 27 via a recovery oil pan 17b and a return line 30b together with the emulsion for cooling being recirculating. The emulsifier having a quantity which is determined by the above-described equation (13) is added by the opening control of a valve 29, and the emulsion is agitated additionally by an agitator 18. Thereafter, the emulsion is sent to the tank 13b of the first rolling oil supply system through a pump 28, and is joined to the emulsion of the first rolling oil supply system.

The concentration with respect to the amount of oil of the emulsifier added to the emulsion of the second rolling oil supply system is 0.005 to 0.2%, for example, when an emulsifier of a cationic dispersion type is used, and the concentration with respect to the amount of oil of the first rolling oil supply system is 0.5%.

The quantity of emulsifier added to the recovered emulsion in the agitation tank 27 is 8.4 cc/min, for example, when the concentration of emulsion and the concentration of emulsifier with respect to the amount of oil of the first rolling oil supply system are 2.5% and 0.5%, respectively, the concentration of emulsion and the concentration of emulsifier with respect to the amount of oil of the second rolling oil supply system are 10% and 0.1%, respectively, and the supply amounts of emulsion supplied to the steel sheet at the fourth and fifth mill stands are 20 l/min and 30 l/min, respectively.

To add the emulsifier to the recovered emulsion and to agitate the emulsion, the following method can also be used.

(1) After the recovered emulsion is joined to the emulsion in the tanks 13a and 13b of the first rolling oil supply system, the emulsifier is added, and the rotational speed of the agitator 18 is increased.

Figure 21:
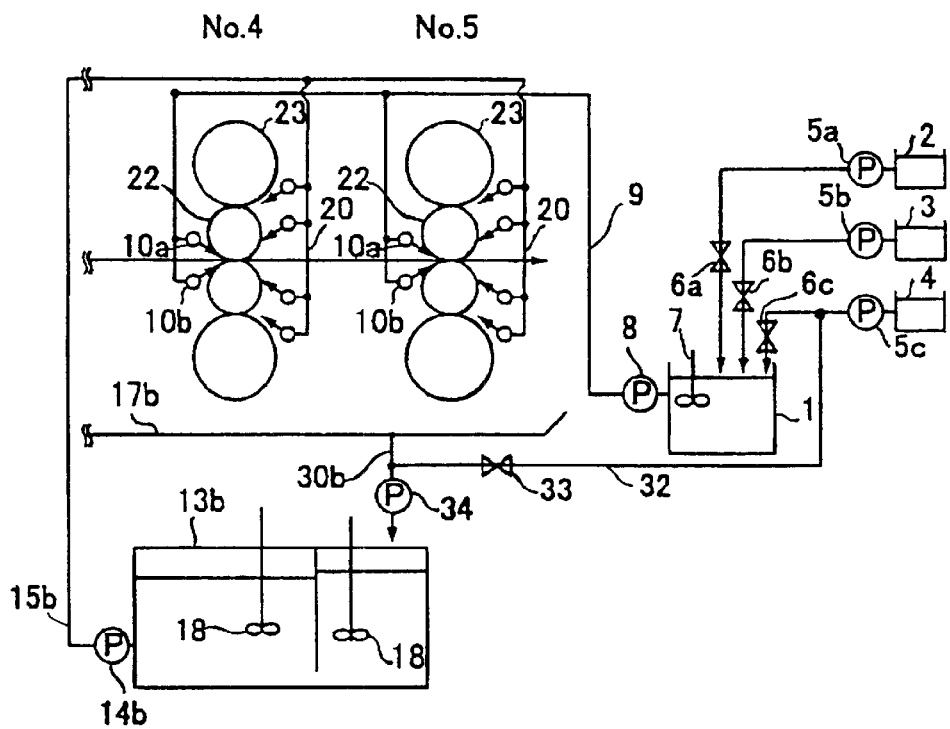
FIG. 21 is a schematic diagram(showing one example of a method for adding and agitating an emulsifier in the method shown in FIG. 20.

(2) As shown in FIG. 21, at a halfway position of the return line 30b running from the recovery oil pan 17b, the emulsifier is added from the tank 4 through a pipe 32 and a valve 33, and shearing is applied to the emulsion by an agitation pump 34 provided at the halfway position of the return line.

Figure 22:
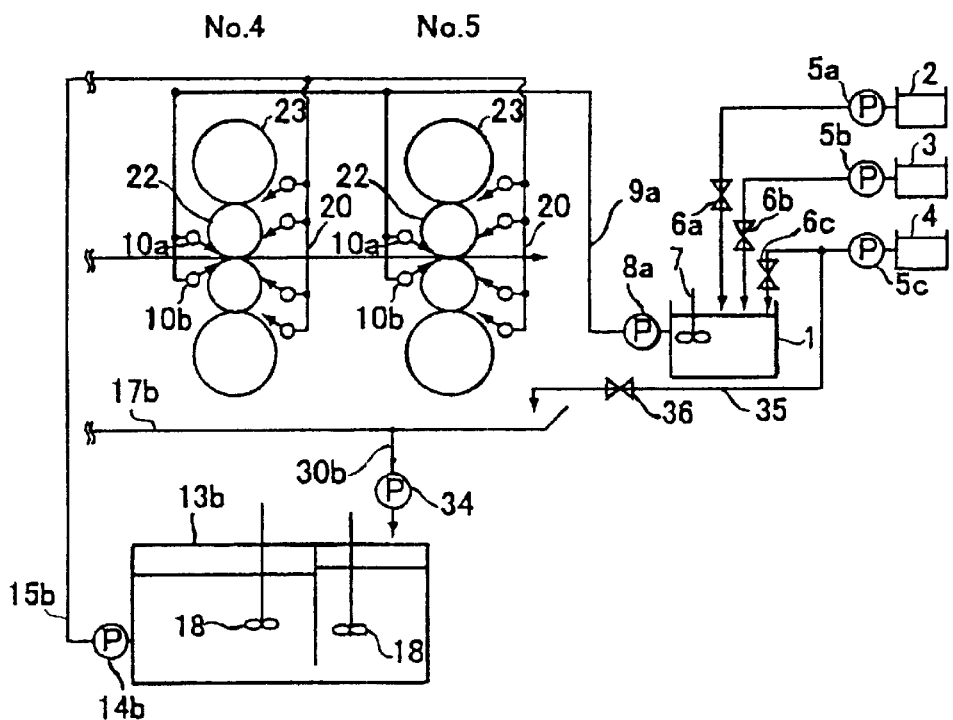
FIG. 22 is a schematic diagram showing one example of a method for adding and agitating an emulsifier in the method shown in FIG. 20.

(3) As shown in FIG. 22, the emulsifier is added in the recovery oil pan 17b from the tank 4 through the pipe 32 and the valve 33, and shearing is applied to the emulsion by the agitation pump 34 provided at the halfway position of the return line 30b.

By the method in accordance with the present invention shown in FIG. 20, a base material for hard tin plate with a thickness of 1.8 mm and a width of 900 mm was rolled to a thickness of 0.18 mm and a base material for soft tin plate with a thickness of 2.3 mm and a width of 1000 mm was rolled to a thickness of 0.20 mm under the rolling oil supply conditions described below while the speed is changed, and the occurrence of chattering and heat scratch was investigated.

As the base oil of rolling oil, beef tallow (viscosity at 40° C.: 45 cSt) was used. As the emulsifier, a cationic emulsifier was used. The concentration with respect to the amount of oil and the coolant temperature of emulsifier of emulsion of the second rolling oil supply system were set at 0.1% and 60° C., respectively, and the concentration of emulsion of the second rolling oil supply system was set at 10%. The particle diameter of emulsion subjected to shearing by the pump and header nozzle was set at 20 $\mu$m. The supply amount of emulsion of the second rolling oil supply system was set at 100 l/min at the fourth mill stand and at 130 l/min at the fifth mill stand. The lubrication at other mill stands and the cooling at all mill stands were accomplished by the first rolling oil supply system, and the emulsion thereof had a concentration of 3.5% and an average particle diameter of 10 $\mu$m and the emulsifier had a concentration with respect to the amount of oil of 0.6%.

For comparison, the same investigation was also conducted in the case where rolling was carried out by the conventional method in which the lubrication of the fourth and fifth mill stands is accomplished by the first rolling oil supply system. In this case, the supply amount of emulsion was set at 2500 l/min at the fourth mill stand and at 4000 l/min at the fifth mill stand.

In the case where a base material for hard tin plate is rolled, as in the first embodiment shown in Table 5, by the method in accordance with the present invention, the rolling speed can be increased to 2100 mpm without the occurrence of chattering and heat scratch. On the other hand, by the conventional method, chattering occurs at a rolling speed of 1500 mpm, and the rolling speed cannot be increased further.

In the case where a base material for soft tin plate is rolled, as in the first embodiment shown in Table 6, by the method in accordance with the present invention, the rolling speed can be increased to 2100 mpm without the occurrence of heat scratch. On the other hand, by the conventional method, heat scratch occurs at a rolling speed of 1700 mpm, and the degree of heat scratch becomes remarkable when rolling is performed at a speed higher than 1700 mpm.

EXAMPLE 4

Figure 23:
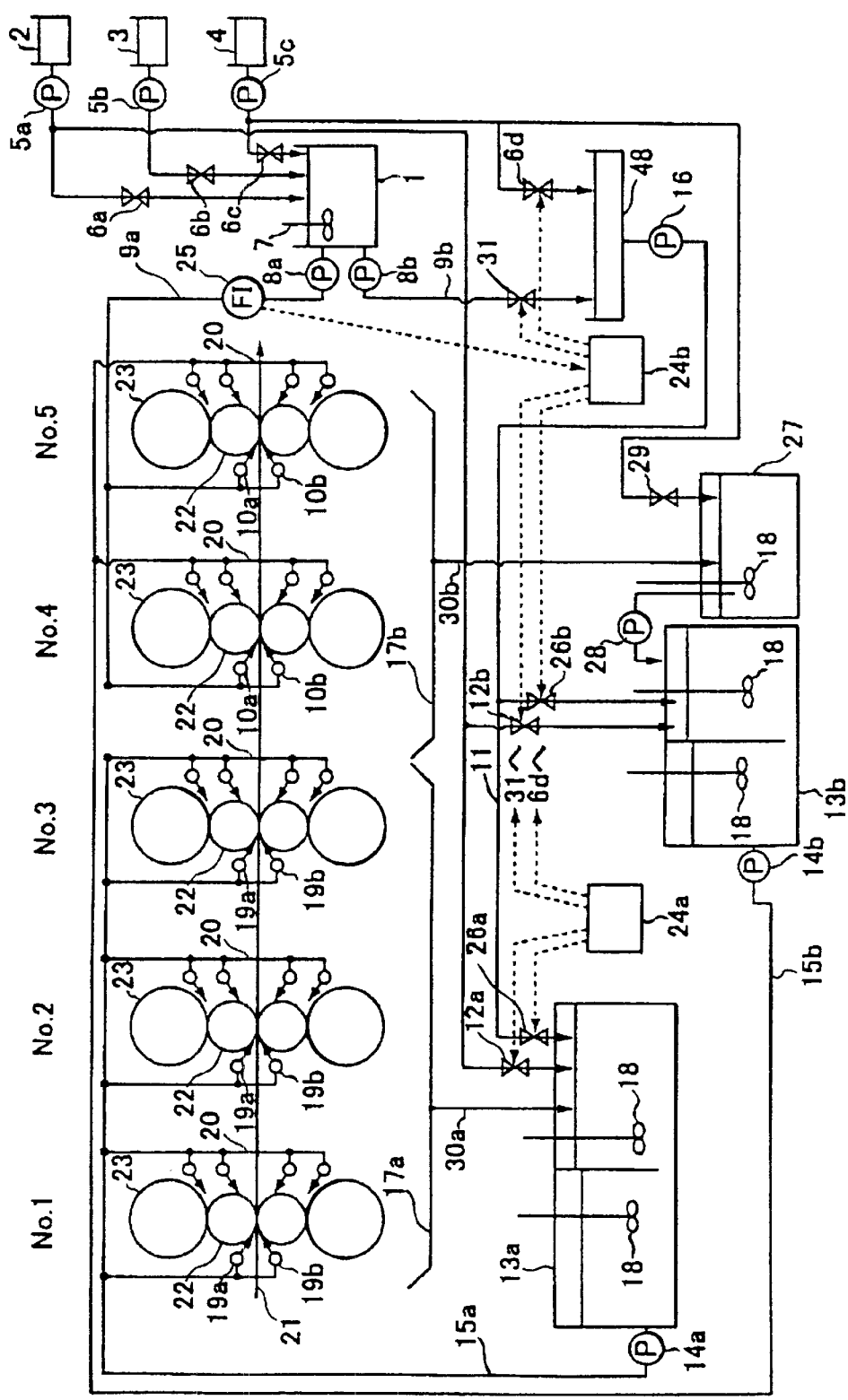
FIG. 23 is a schematic diagram showing still another example of a method for supplying rolling oil for cold rolling in accordance with the present invention.

FIG. 23 shows still another example of a method for supplying rolling oil for cold rolling in accordance with the present invention. In this figure, although the basic configuration is the same as that in the case of FIG. 20, the emulsion in the tank 1 of the second rolling oil supply system is recovered into an oil pan 48 through a pump 8b and a pipe 9b, and the emulsifier having a quantity which is determined by the above-described equation (14) is added by controlling the opening of a valve 6d, and thereafter the emulsion is subjected to shearing by a pump 16, and is resupplied into the tanks 13a and 13b of the first rolling oil supply system. The replenishment amount is controlled by the opening of valves 26a and 26b.

To add the emulsifier and to agitate the emulsion, the following method can also be used.

(1) After the tanks 13a and 13b of the first rolling oil supply system are replenished with the emulsion of the second rolling oil supply system, the emulsifier is added, and the rotational speeds of the agitators 18 in the tanks 13a and 13b are increased.

Figure 24:
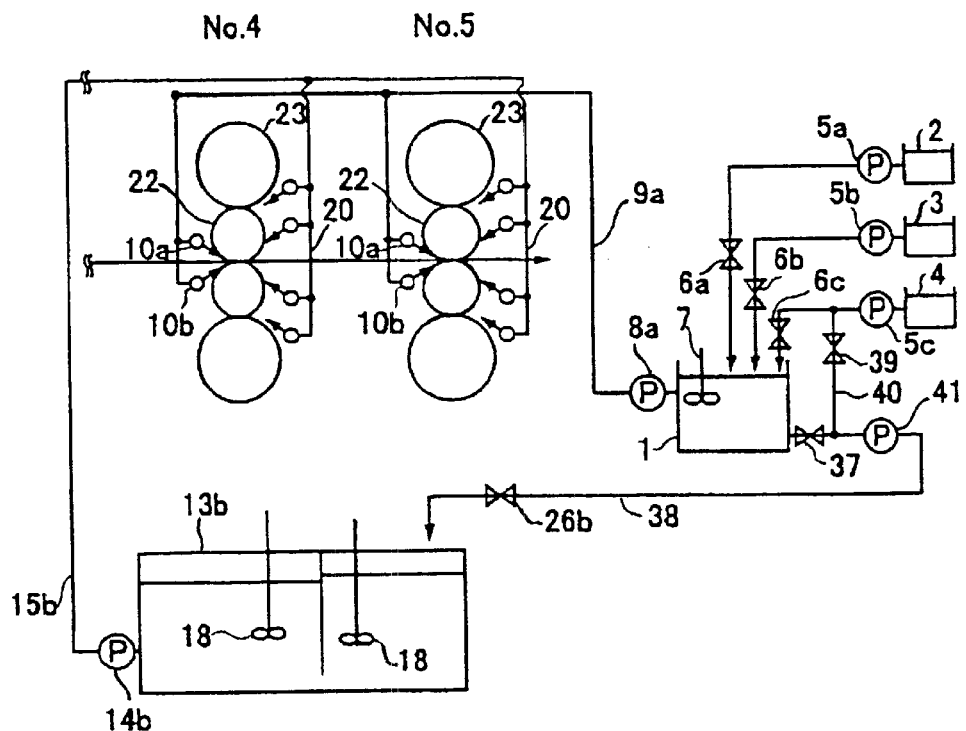
FIG. 24 is a schematic diagram showing one example of a method for adding and agitating an emulsifier in the method shown in FIG. 23.

(2) As shown in FIG. 24, at a halfway position of a pipe 38 running from the tank 1 of the second rolling oil supply system to the tank 13b of the first rolling oil supply system, the emulsifier is added through a valve 39 and a pipe 40, and then the emulsion is made to pass through a pump 41 and thus is subjected to shearing.

Figure 25:
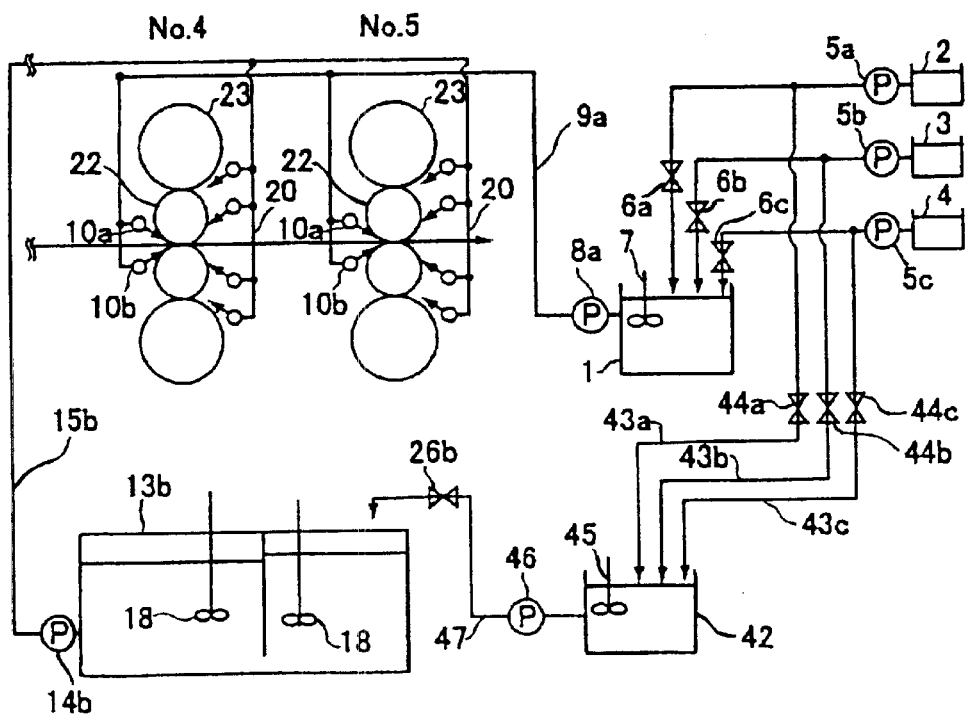
FIG. 25 is a schematic diagram showing one example of a method for adding and agitating an emulsifier in the method shown in FIG. 23.

(3) As shown in FIG. 25, a replenishment tank 42 is provided, and hot water, stock oil, and an emulsifier are sent from the hot water tank 2, the stock oil tank 3, and the emulsifier tank 4 to the tank 42 through pipes 43a, 43b, and 43c, respectively. The quantities of the hot water, stock oil, and emulsifier are controlled by valves 44a, 44b, and 44c, respectively. The emulsion is agitated by an agitator 45 in the replenishment tank 42 so that the particle diameter thereof is made smaller, by which stable emulsion is prepared, and is resupplied to the tank 13b through a pipe 47 by a supply pump 46.

Figure 26:
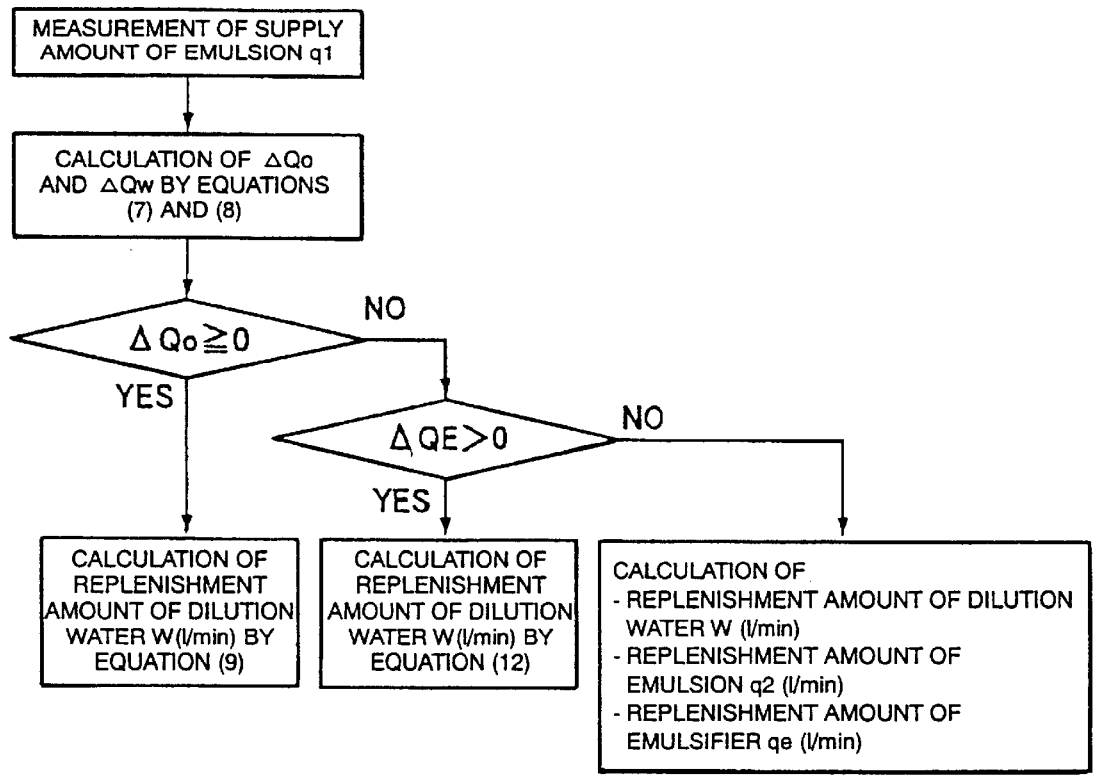
FIG. 26 is a flowchart for calculating the replenishment amount of emulsion and dilution water and the addition amount of an emulsifier.

The calculating device 24b calculates the replenishment amount of emulsion of the second rolling oil supply system and dilution water resupplied into the tank 13b and the quantity of emulsifier added in the oil pan 48. The calculation flow is shown in FIG. 26. The supply amount q1 of emulsion sprayed on the surface of the steel sheet 21 on the entrance side of the fourth and fifth mill stands from the second rolling oil supply system is measured by the flowmeter 25, and based on the measured value, the replenishment amount q2 of emulsion of the second rolling oil supply system, the quantity qe of emulsifier added in the oil pan 48, and the replenishment amount W of dilution water are calculated by the above-described equations (7) to (12) and (14). Based on these calculated values, the flow control valves 6d, 31, 12b and 26b are regulated.

For example, when the concentration of emulsion of the first rolling oil supply system for the fourth and fifth mill stands is 3.5%, the concentration with respect to the amount of oil of emulsifier of the first rolling oil supply system is 0.5%, the oil loss amount and the water loss amount are 1.4 l/min and 18.4 l/min, respectively, the concentration of emulsion of the second rolling oil supply system is 10%, the concentration with respect to the amount of oil of emulsifier of the second rolling oil supply system is 0.1%, and the supply amounts of emulsion supplied to a steel sheet are 20 l/min and 30 l/min at the fourth and fifth mill stands, respectively, the oil increase amount of the first rolling oil supply system $\Delta Qo$ is 2.1 l/min according to the equation (7), which means that ΔQo>0. Thus, only dilution water is replenished to keep the concentration of the first rolling oil supply system fixed. The replenishment amount W of dilution water is determined to be 55.3 l/min by the equation (9).

When the supply amount of emulsion supplied to a steel sheet is 5 l/min at each of the fourth and fifth mill stands, the oil increase amount of the first rolling oil supply system ΔQo is −0.14 l/min according to the equation (7), which means that ΔQo<0. Thus, the resupply of rolling oil to the first rolling oil supply system is needed. When the liquid quantity of emulsion in the tank of the first rolling oil supply system is kept constant (ΔQE=0), emulsion of the second rolling oil supply system and dilution water are replenished. From the equation (10), the supply amount q2 of emulsion and the replenishment amount of dilution water are determined to be 1.4 l/min and 6.4 l/min, respectively, and from the equation (14), the addition amount of emulsifier is determined to be 0.6 cc/mm.

When the liquid quantity of emulsion in the tank is larger than the fixed level (ΔQE>0), only dilution water is replenished. The replenishment amount W of dilution water is determined to be 33.0 l/min by the equation (12).

The calculating device 24a calculates the replenishment amount of emulsion supplied from the tank 1 of the second rolling oil supply system to the tank 13a of the first rolling oil supply system and dilution water. The supply amount q2 of emulsion supplied from the tank 1 and the replenishment amount W of dilution water are calculated using the equations (10) to (11), and the addition amount qe of emulsifier is calculated using the equation (14). Based on the calculation result, the flow control valves 6d, 31, 12a, and 26b are regulated, by which the tank 13a is replenished with oil.

For example, when the concentration of emulsion of the first rolling oil supply system for the first to third mill stands is 2.5%, the concentration with respect to the amount of oil of emulsifier of the first rolling oil supply system is 0.5%, the oil loss amount and the water loss amount are 0.6 l/min and 7.9 l/min, respectively, the concentration of emulsion in the tank 1 of the second rolling oil supply system is 10%, and the concentration with respect to the amount of oil of emulsifier of the second rolling oil supply system is 0.1%, the replenishment amount W of dilution water is 25.9 l/min, the supply amount q2 of emulsion of the second rolling oil supply system is 6 l/min, and the addition amount of emulsifier is 13 cc/min.

By the method in accordance with the present invention shown in FIG. 23, a base material for tin plate with a thickness of 1.8 to 2.0 mm and a width of 800 to 1200 mm was rolled to a thickness of 0.16 to 0.25 mm under the rolling oil supply conditions described below, and the unit consumption of rolling oil was investigated.

As the base oil of rolling oil, beef tallow (viscosity at 40° C.: 45 cSt) was used. As the emulsifying dispersant, a cationic emulsifier was used. The concentration of emulsion of the second rolling oil supply system was set at 10%, and the average particle diameter thereof was set at 20 μm. The concentration with respect to the amount of oil of emulsifier of the second rolling oil supply system was set at 0.1%. The concentration of emulsion of the first rolling oil supply system was set at 3%, and the average particle diameter thereof was set at 9 μm. The concentration with respect to the amount of oil of emulsifier of the first rolling oil supply system was set at 0.6%. The temperatures of emulsion of the first and second rolling oil supply systems were set at 60° C. At this time, the supply amount of emulsion supplied from the second rolling oil supply system was changed according to the post-rolling thickness. The supply amounts at the fourth and fifth mill stands were set at 100 l/min and 130 l/min, respectively, when the sheet thickness is 0.16 to 0.20 mm, and at 5 l/min and 13 l/min, respectively, when the sheet thickness is 0.20 to 0.25 mm.

For comparison, the same investigation was also conducted in the case where rolling was carried out by the conventional method in which the lubrication of the fourth and fifth mill stands is accomplished by the first rolling oil supply system. In this case, the supply amount of emulsion was set at 3000 l/min at the fourth mill stand and at 4000 l/min at the fifth mill stand.

The same unit consumption of rolling oil as that in the first embodiment shown in Table 7 can be obtained. In the method in accordance with the present invention, therefore, the unit consumption of rolling oil can be decreased as compared with the conventional method. The reason for this is that in the method in accordance with the present invention, the emulsion of the second rolling oil supply system can be utilized effectively as make-up oil for the compensation of oil loss of the first rolling oil supply system, and the supply amount of emulsion can be decreased as compared with the conventional method, so that the amount of oil loss due to fume etc. can be decreased.

Third embodiment

Figure 27:
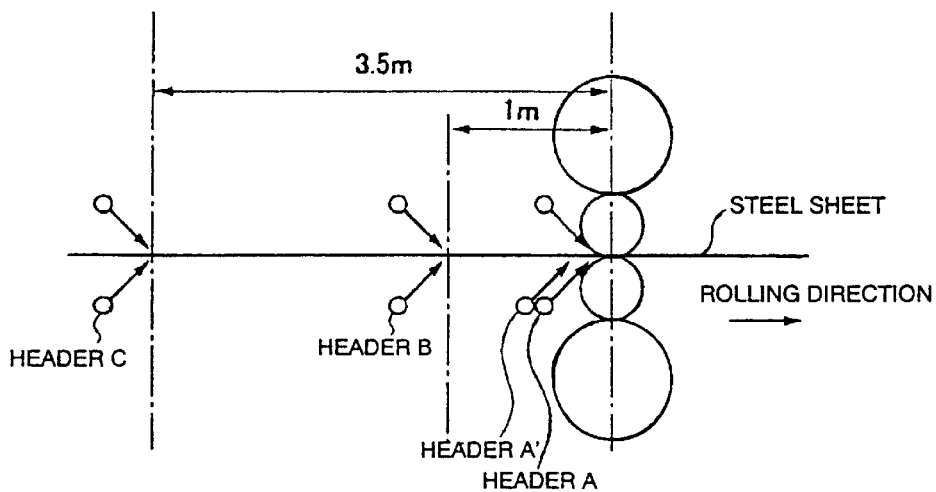
FIG. 27 is a view showing the positions of spray headers for supplying emulsion in a second rolling oil supply system.

The inventors measured the quantity of oil sticking onto a steel sheet by the above-described method by changing the position of spray header, as shown in FIG. 27, for supplying emulsion of the second rolling oil supply system to A, B and C. The position A is a position very close to the roll bite where general lubricating emulsion of the first rolling oil supply system is supplied. The positions B and C are positions 1 m and 3 m distant from the roll bite toward the upstream mill stands, respectively. The position A' is the position described in JP-B-59-24888 in which emulsion with a concentration higher than that of the first rolling oil supply system is supplied onto the back surface of the steel sheet close to the roll bite. At this time, beef tallow was used as the rolling oil. From the spray header positions A, B and C, emulsion with a concentration of 4% and an average particle diameter of 9 μm was supplied at a flow rate of 3400 l/min. At the same time that the emulsion is supplied from the position A, emulsion with a concentration of 10% and an average particle diameter of 9 μm was supplied at a flow rate of 200 l/min from the position A'.

Figure 28:
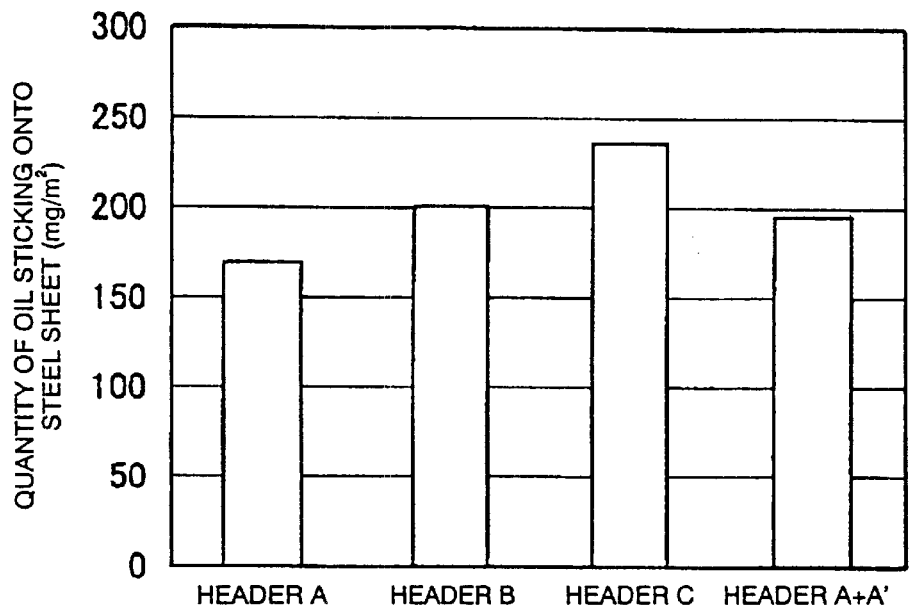
FIG. 28 is a graph showing the relationship between the position of spray header and the quantity of oil sticking onto a steel sheet.

FIG. 28 shows the relationship between the position of spray header and the quantity of oil sticking onto a steel sheet.

The quantity of oil sticking onto a steel sheet increases as the position of spray header is shifted from A to C, that is, from the roll bite toward the upstream mill stands. This means that the lubricating ability can be improved by shifting the position of spray header from the roll bite toward the upstream mill stands.

Even if emulsion is supplied from the position A' at the same time that emulsion is supplied from the position A, there can be obtained only a quality of oil sticking onto the steel sheet of the same degree as that of the quantity of oil obtained when emulsion is supplied from the position B.

The relationship between the position of spray header and the quantity of oil sticking onto a steel sheet is presumably based on the phenomenon described below.

Figure 29:
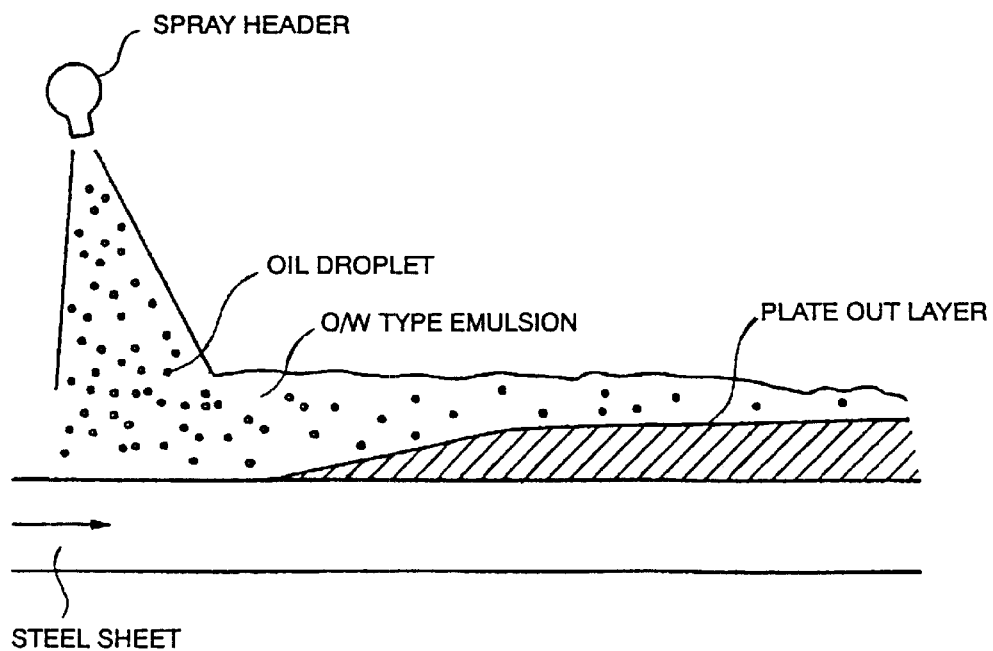
FIG. 29 is a schematic view showing a process for yielding a plate out layer.
Figure 30:
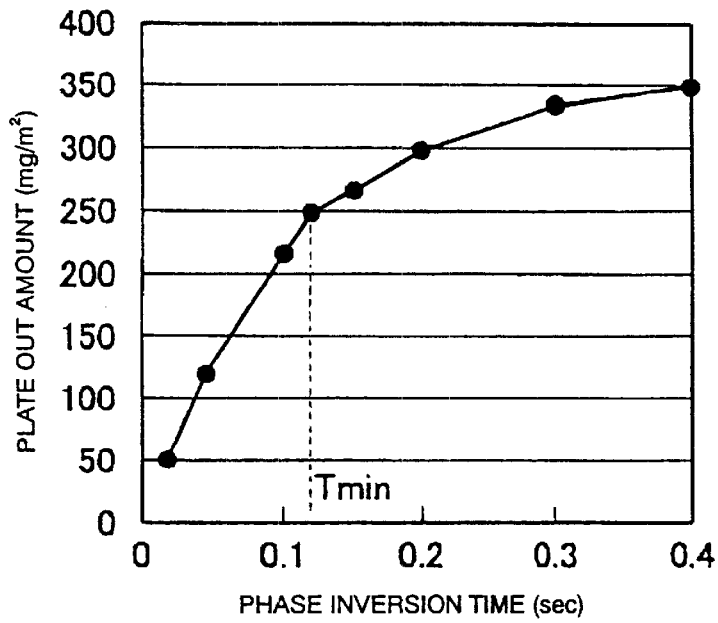
FIG. 30 is a graph showing the relationship between the phase inversion time and the plate out amount.

FIG. 29 schematically shows a process in which oil is separated from water to yield an oil film (plate out layer) when emulsion is sprayed on the steel sheet. When emulsion of what we call an O/W type, in which oil droplets are dispersed in water, is sprayed on the front surface of steel sheet, the oil droplets in emulsion are first subjected to a pressure from the steel sheet by collision, and then subjected to shearing by the relative speed with respect to the steel sheet, so that the oil droplets adsorb physically to the steel sheet of which the temperature is elevated. At this time, water evaporates in some cases, so that the emulsion of an O/W type inverts its phase to emulsion of a W/O type (water droplets are dispersed in oil) or to oil single layer. It is thought that the plate out layer is formed in this manner. Since this process involves a reaction of phase inversion under the above-described dynamical conditions and thermal conditions, this process does not take place simultaneously with spraying, but some period of time (phase inversion time) is required. FIG. 30 shows the relationship between the actually measured phase inversion time and the plate out amount. The plate out amount increases with increasing phase inversion time, and suddenly decreases at the phase inversion time shorter than the minimum phase inversion time Tmin.

Thereupon, in the method in which emulsion is supplied just before the roll bite, a sufficient phase inversion time cannot be secured. Therefore, if the position of spray header is shifted from the roll bite toward the upstream mill stands so that the phase inversion time can be secured, a plate out layer of an amount necessary for lubrication can be formed, so that the quantity of oil sticking onto the steel sheet can be increased.

Thus, the spray header for supplying emulsion of the second rolling oil supply system is preferably provided at a position such that the distance L (m) between the roll bite and the spray header satisfies the following equation (1).

$$L \geq Vin \times Tmin \quad (1)$$

where, Vin is the strip speed (m/sec) on the entrance side of roll, and Tmin is the minimum phase inversion time (sec).

The concentration, supply amount, and replenishment amount of emulsion of the second rolling oil supply system and the replenishment amount of dilution water are determined by the same method as that in the first embodiment.

The method for shifting the position of spray header from the roll bite toward the upstream mill stands can be applied to the rolling oil supply system in a direct mode.

Next, the inventors provided spray headers for supplying emulsion of the second rolling oil supply system at the fourth and fifth mill stands of a cold tandem mill consisting of a total of five mill stands so as to satisfy the above-described equation (1), and investigated the occurrence of chattering.

Figure 31:
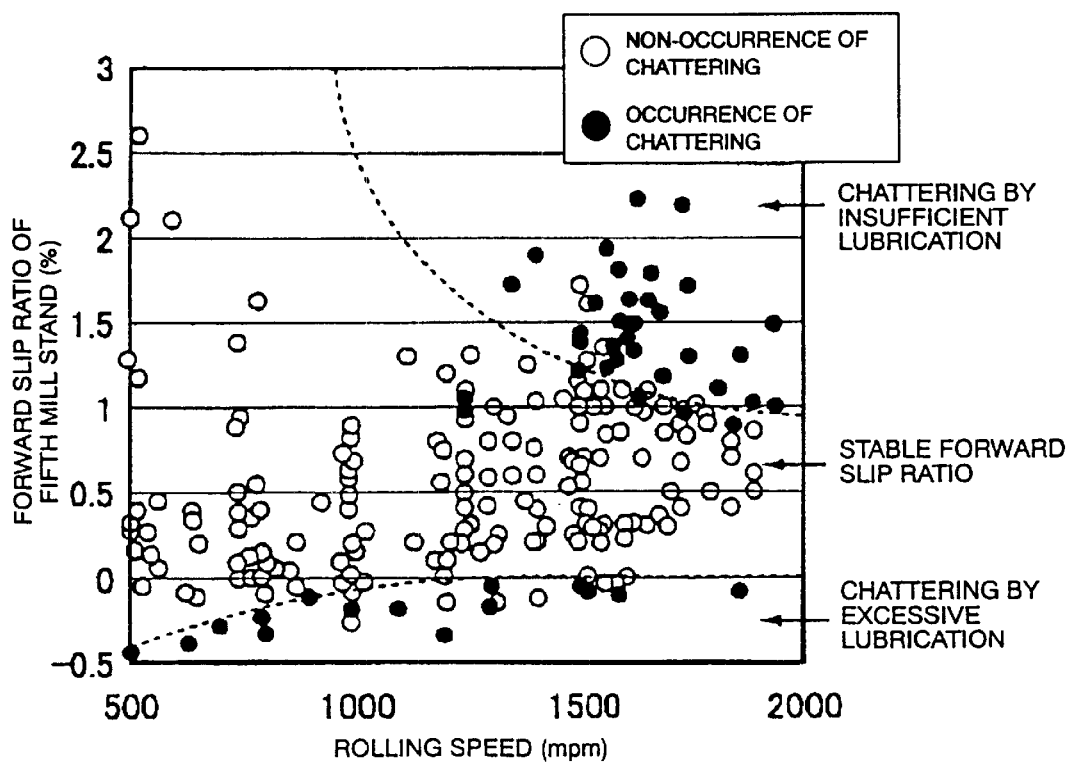
FIG. 31 is a graph showing the relationship between the rolling speed, the forward slip ratio of a fifth mill stand, and the occurrence of chattering.

FIG. 31 shows the relationship between the rolling speed, the forward slip ratio of the fifth mill stand, and the occurrence of chattering (indicates occurrence and ○ indicates non-occurrence).

The occurrence of chattering depends on the rolling speed and the forward slip ratio, but there exists a range of forward slip ratio in which chattering does not occur without the dependence on the rolling speed.

Generally, when the rolling conditions such as reduction rate and tension are the same, the forward slip ratio is one index representing the rolling lubrication state. However, chattering occurring in a range of forward slip ratio not lower than 1% is chattering caused by insufficient lubrication, and chattering occurring in a range of forward slip ratio not higher than 0% is chattering caused by excessive lubrication.

Figure 32:
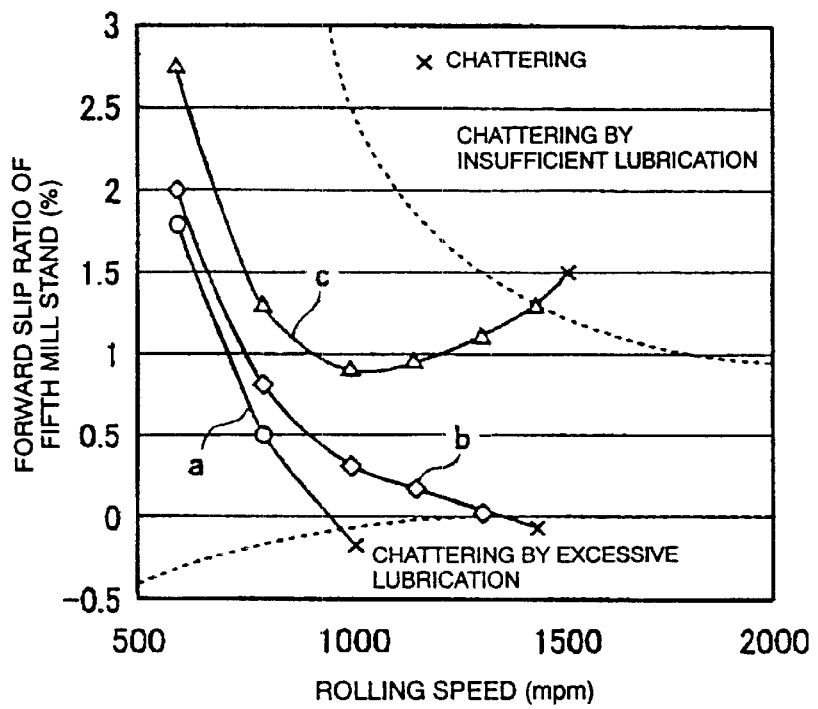
FIG. 32 is a graph showing the relationship between the rolling speed and the forward slip ratio of a fifth mill stand.

In a low and medium speed range in which the rolling speed is 500 to 1000 mpm, the forward slip ratio at the fifth mill stand changes with respect to the rolling speed as indicated by the curve (a) in FIG. 32, decreasing with the rolling speed. The cause for this is that the friction coefficient decreases with the rolling speed. If the forward slip ratio is lower than 0%, chattering caused by excessive lubrication occurs. In order to prevent such chattering, it is effective that the supply amount of emulsion is decreased to increase the friction coefficient, whereby the forward slip ratio is made 0% or higher.

On the other hand, in a high speed range in which the rolling speed is 1200 mpm or higher, both of chattering caused by excessive lubrication and chattering caused by insufficient lubrication occur. The forward slip ratio changes as indicated by the curve (b) in FIG. 32 in the case of excessive lubrication, and as indicated by the curve (c) in the case of insufficient lubrication. Therefore, in order to prevent chattering, means capable of controlling the forward slip ratio over a wide range of 0 to 1% is needed.

Thereupon, to study the conditions for providing a wide change range of forward slip ratio with respect to the change in the supply amount of emulsion, the inventors determined the relationships between the supply amount of emulsion and the forward slip ratio and between the supply amount of emulsion and the quantity of oil sticking onto a steel sheet under the conditions given in Table 8 by changing the position of spray header to A, 13 and C as shown in FIG. 27.

TABLE 8

| | |
|---|---|
| Rolling mill | 5-stands tandem mill |
| Steel sheet | Base material for hard tin plate |
| | Thickness: 0.183 mm |
| | Width: 900 mm |
| Speed of steel sheet on entrance side | 1500 mpm |
| Rolling oil | Base oil: beef tallow |
| | Emulsifying dispersant cationic emulsifier. |
| | Concentration of emulsion: 4% |
| | Average particle diameter of emulsion: 10 μm |

Figure 33:
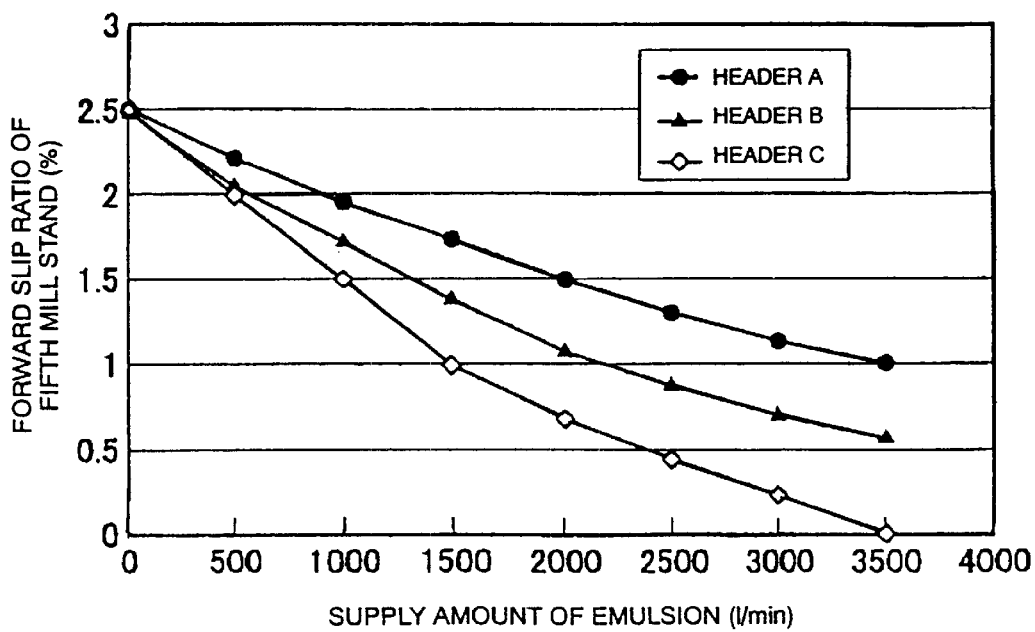
FIG. 33 is a graph showing the relationship between the supply amount of emulsion and the forward slip ratio.

FIG. 33 shows the relationship between the supply amount of emulsion and the forward slip ratio. The change range of forward slip ratio with respect to the change in the supply amount of emulsion increases as the position of spray header is shifted far from the roll bite toward the upstream mill stands.

Figure 34:
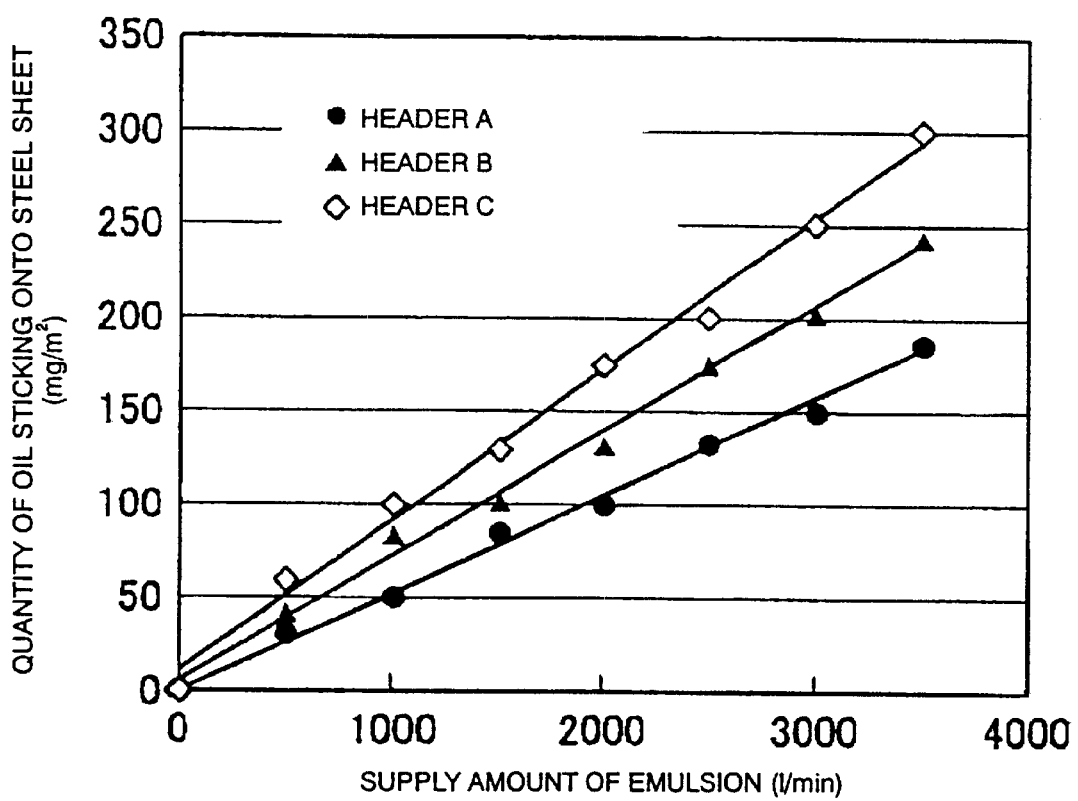
FIG. 34 is a graph showing the relationship between the supply amount of emulsion and the quantity of oil sticking onto a steel sheet.

FIG. 34 shows the relationship between the supply amount of emulsion and the quantity of oil sticking onto a steel sheet. The quantity of oil sticking onto a steel sheet increases as the position of spray header is shifted far from the roll bite toward the upstream mill stands.

The cause for these results is as follows: By spraying emulsion on the steel sheet at a position distant from the roll bite, the phase inversion time for emulsion to plate out on the front surface of steel sheet is secured, so that the plate out amount increases. Therefore, if the supply amount of emulsion is changed, the friction coefficient changes greatly, so that the change range of forward slip ratio increases. In particular, at high speed rolling, since the time for emulsion to plate out is short, it is effective to shift the position of spray header as far as possible from the roll bite toward the upstream mill stands.

Therefore, if the spray header is provided at a position distant from the roll bite toward the upstream mill stands, and the supply amount of emulsion sprayed on the steel sheet is controlled, the forward slip ratio during rolling can be controlled so as to be within a target range.

EXAMPLE 5

Figure 35:
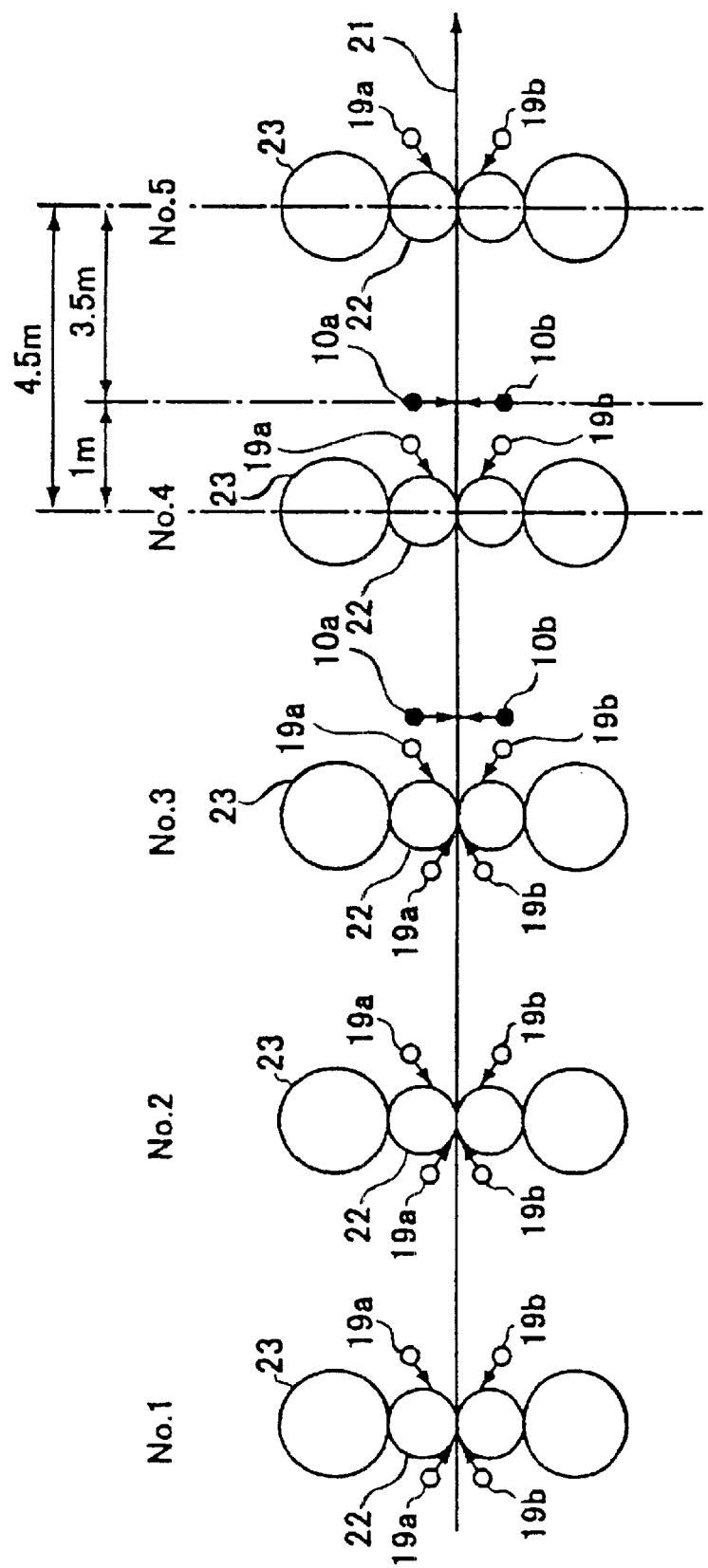
FIG. 35 is a schematic diagram showing still another example of a method for supplying rolling oil for cold rolling in accordance with the present invention.

FIG. 35 shows still another example of a method for supplying rolling oil for cold rolling in accordance with the present invention.

In this method, spray headers 10a and 10b are provided at a position that satisfies the above-described equation (1) on the upstream mill stand side of the fourth and fifth mill stands of a cold tandem mill consisting of five mill stands having the first rolling oil supply system in a conventional recirculation mode.

The distance L between the spray headers 10a and 10b and the roll bites of the fourth and fifth mill stands is 1.8 m or larger at the fourth mill stand, and 2.8 m or larger at the fifth mill stand, being set at 3.5 m in this example, because if, for example, beef tallow based emulsion is used, the minimum phase inversion time Tmin is 0.12 sec from FIG. 30, and also if the highest rolling speed is 2000 mpm and the reduction rates of the fourth and fifth mill stands are 35% and 30%, respectively, the strip speeds on the entrance side of the fourth and fifth mill stands are 910 mpm and 1400 mpm, respectively.

By the method in accordance with the present invention shown in FIG. 35, a base material for hard tin plate with a thickness of 1.8 mm and a width of 900 mm was rolled to a thickness of 0.183 mm under the rolling oil supply conditions described below by changing the rolling speed, and the quantity of oil sticking onto the steel sheet and the friction coefficient of the fifth mill stand were investigated.

As the base oil of rolling oil, beef tallow (viscosity at 40° C.: 45 cSt) was used. As the emulsifying dispersant, a cationic emulsifier was used. The concentration of emulsion was set at 4%, the average particle diameter thereof was set at 9 μm, the concentration of emulsifier with respect to the amount of oil was set at 0.1%, and the concentration of emulsifier with respect to the amount of oil was set at 0.6%. Also, the temperature of emulsion was set at 60° C., and the supply amount of emulsion at the fourth and fifth mill stands was set at 3400 l/min.

For comparison, the same investigation was also conducted in the case where the spray headers were provided at the position A (conventional method 1) and the position A+A' (conventional method 2) in FIG. 27, and the lubrication of the fourth and fifth mill stands was accomplished by the conventional method. At this time, the supply amount of emulsion at the fourth and fifth mill stands was set at 3400 l/min for the spray header at the position A, and at 200 l/min for the spray header at the position A'. The concentration of emulsion supplied from the spray header at the position A' was set at 10%.

Figure 36A:
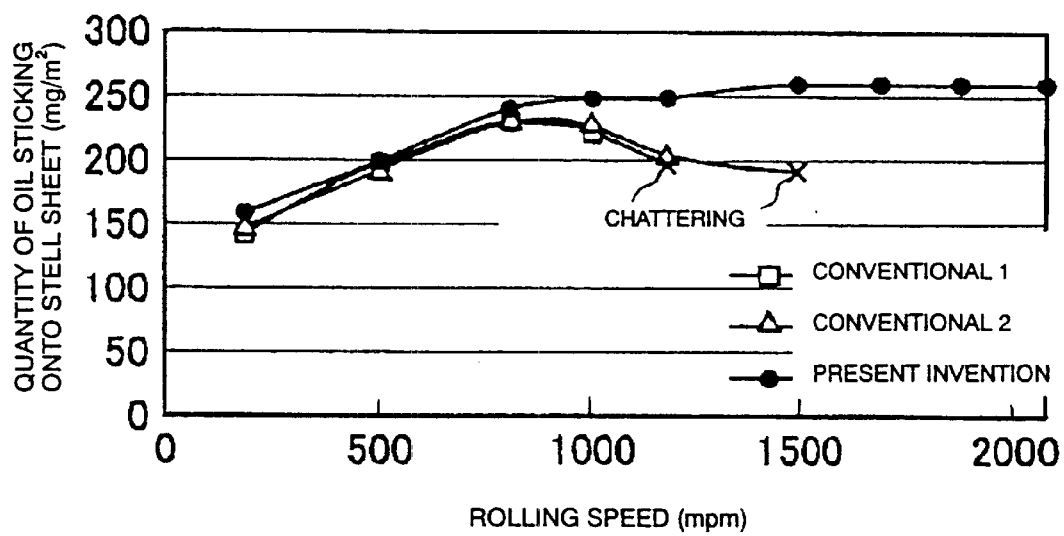
FIGS. 36A and 36B are graphs showing the relationship between the rolling speed and the quantity of oil sticking onto the front and back surface of a steel sheet, respectively.
Figure 36B:
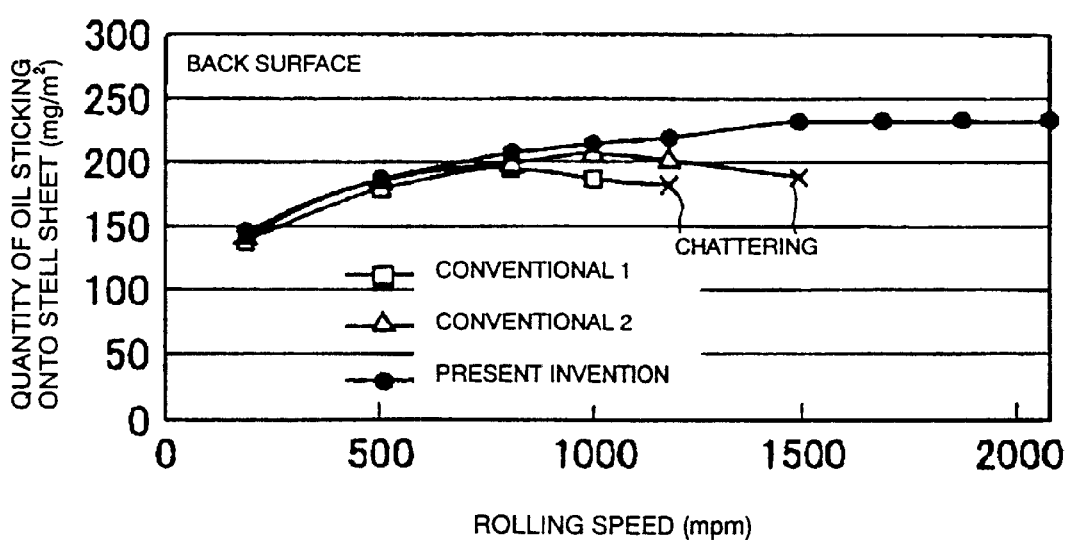

FIGS. 36A and 36B show the relationship between the rolling speed and the quantity of oil sticking onto the front and back surface of a steel sheet, respectively.

Figure 37:
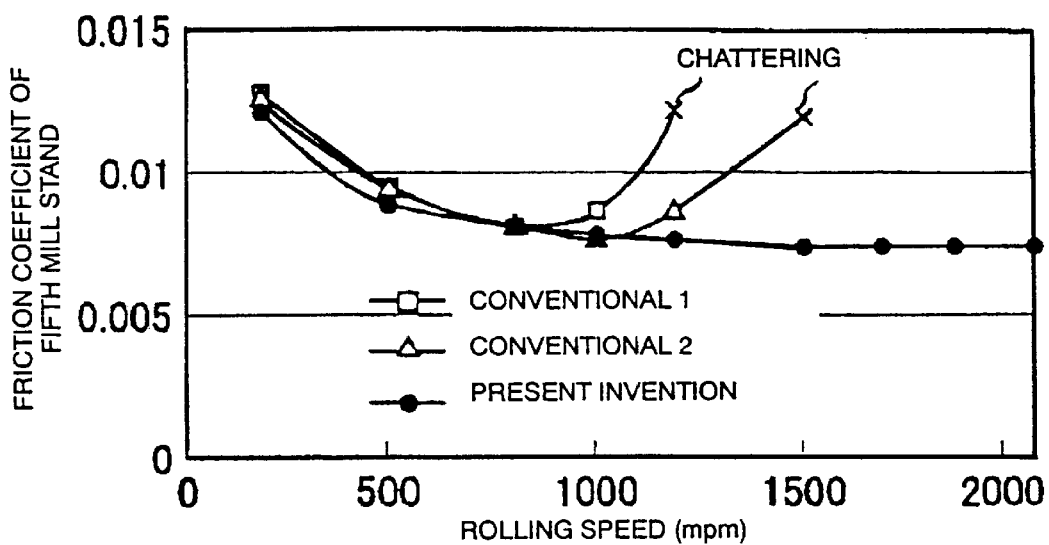
FIG. 37 is a graph showing the relationship between the rolling speed and the friction coefficient of a fifth mill stand.

FIG. 37 shows the relationship between the rolling speed and the friction coefficient of the fifth mill stand.

In the method in accordance with the present invention, even if the rolling speed is 1200 mpm or higher, the quantity of oil sticking onto the steel sheet can be obtained steadily on the front and back surface of the steel sheet. Therefore, the increase in the friction coefficient of the fifth mill stand is restrained, whereby stable friction conditions can be obtained.

In particular, at high speed rolling, the friction coefficient scarcely increases, so that chattering caused by insufficient lubrication does not occur.

On the other hand, in the conventional method 1, if the rolling speed is 800 mpm or higher, the quantity of oil sticking onto the steel sheet decreases on the front and back surface of the steel sheet. Also, in the conventional method 2, at the rolling speed of 1000 mpm, the quantity of oil sticking onto the steel sheet is large only on the back surface of the steel sheet as compared with the conventional method 1, but if the rolling speed is 1200 mpm or higher, the quantity of oil sticking onto the steel sheet decreases suddenly. Accordingly, the friction coefficient in the conventional methods 1 and 2 is increased by high speed rolling, so that chattering caused by insufficient lubrication occurs at speeds of 1200 mpm and 1500 mpm, respectively.

EXAMPLE 6

A base material for soft tin plate with a thickness of 2.3 mm and a width of 900 mm was rolled to a thickness of 0.183 mm by the same method and under the same rolling oil supply conditions as those of example 5 by changing the rolling speed, and the friction coefficient of the fifth mill stand and the temperature of steel sheet were investigated.

Figure 38:
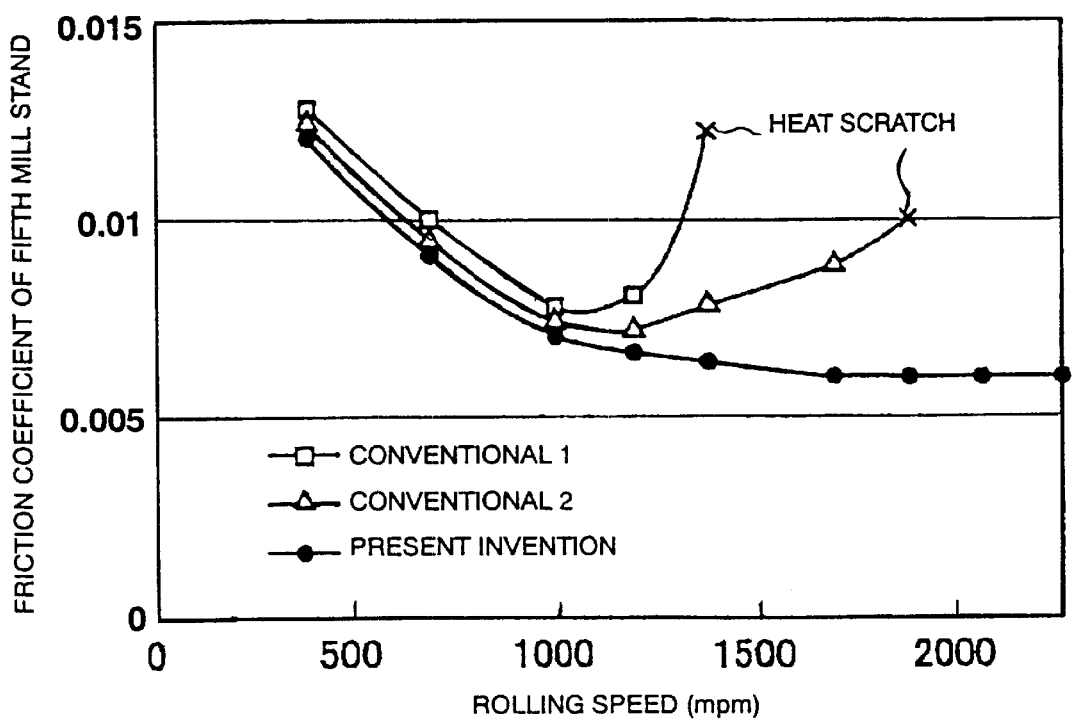
FIG. 38 is a graph showing the relationship between the rolling speed and the friction coefficient of a fifth mill stand.

FIG. 38 shows the relationship between the rolling speed and the friction coefficient of the fifth mill stand.

Figure 39:
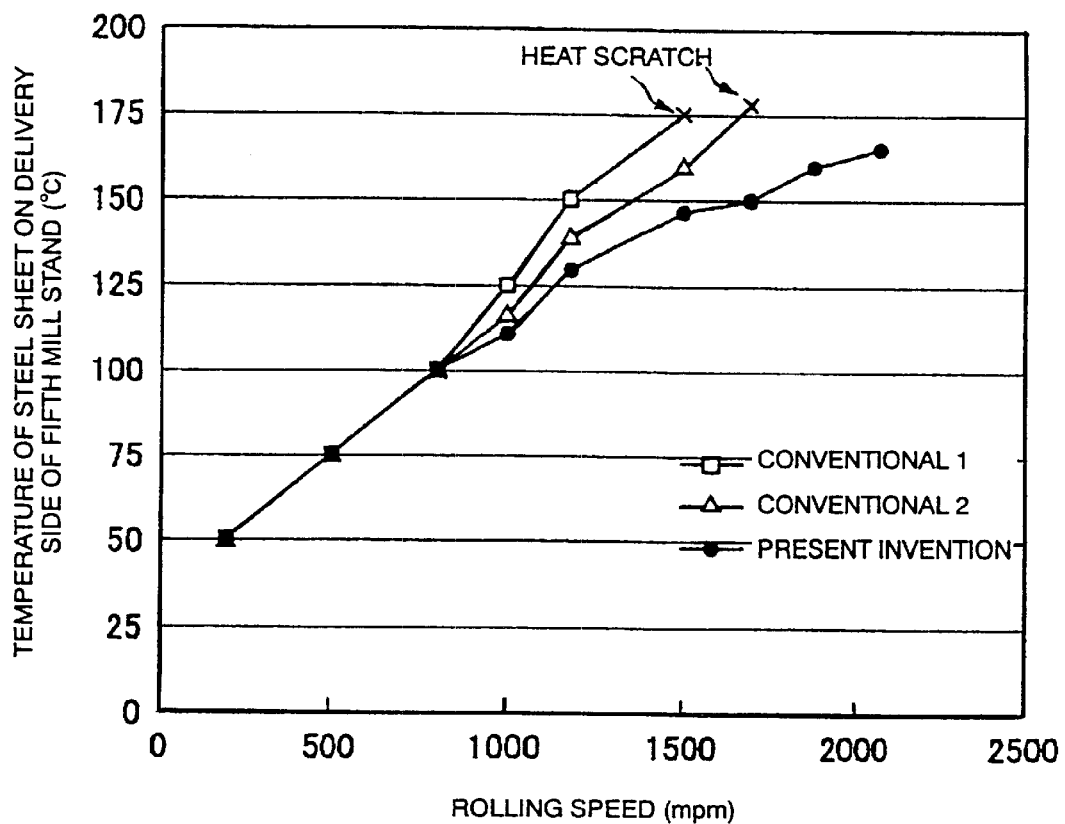
FIG. 39 is a graph showing the relationship between the rolling speed and the temperature of a steel sheet on the delivery side of a fifth mill stand.

FIG. 39 shows the relationship between the rolling speed and the temperature of steel sheet on the delivery side of the fifth mill stand.

In the present invention, even if the rolling is performed at a high speed, the increase in the friction coefficient of the fifth mill stand is restrained, so that stable friction conditions can be obtained. In particular, at high speed rolling, the friction coefficient scarcely increases. As a result, the increase in the temperature of steel sheet is also restrained, so that no heat scratch is produced.

On the other hand, the friction coefficient in the conventional methods 1 and 2 is increased at high speed rolling, and the temperature of steel sheet on the delivery side of the fifth mill stand also increases greatly. At a rolling speed of 1500 mpm or higher in the conventional method 1, and at a rolling speed of 1700 mpm or higher in the conventional method 2, the temperature of steel sheet exceeds 170° C., so that a heat scratch is produced.

EXAMPLE 7

Figure 40:
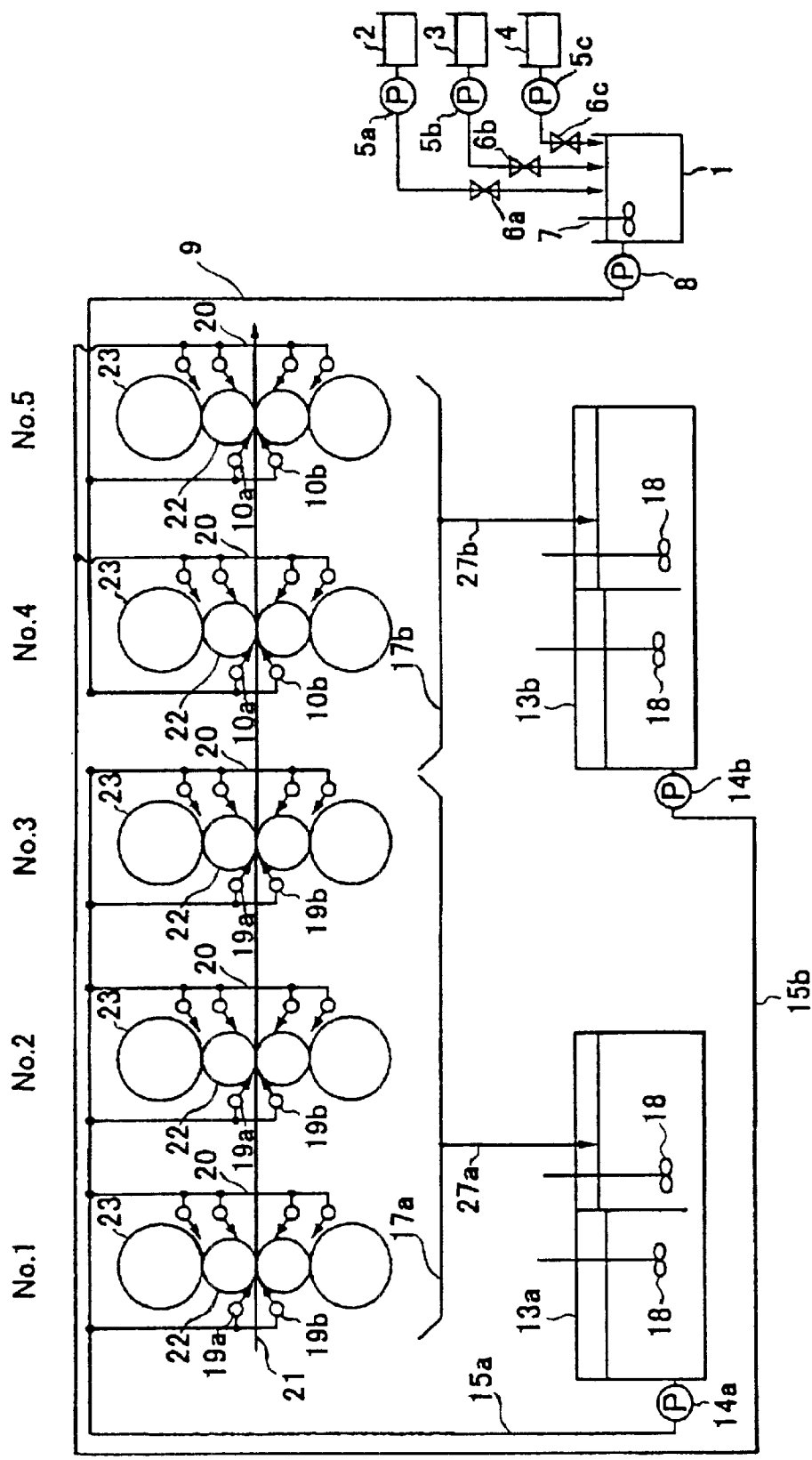
FIG. 40 is a schematic diagram showing still another example of a method for supplying rolling oil for cold rolling in accordance with the present invention.

FIG. 40 shows still another example of a method for supplying rolling oil for cold rolling in accordance with the present invention.

As in the method shown in FIG. 8, in this method, the fourth and fifth mill stands of a cold tandem mill, which consists of five mill stands having the first rolling oil supply system in a conventional recirculation mode, are provided with the second rolling oil supply system. The lubrication and cooling of the first to third mill stands are accomplished by the first rolling oil supply system, the lubrication of the fourth and fifth mill stands is accomplished by the second rolling oil supply system, and the cooling of the fourth and fifth mill stands is accomplished by the first rolling oil supply system. However, the spray headers 10a and 10b for supplying emulsion of the second rolling oil supply system are provided at a position that satisfies the above-described equation (1) on the upstream mill stand side of each of the fourth and fifth mill stands, so that the phase inversion time for emulsion to plate out is secured.

The distance L between the spray headers 10a and 10b and the roll bites of the fourth and fifth mill stands is 1.8 m or larger at the fourth mill stand, and 2.8 m or larger at the fifth mill stand, being set at 3.5 m in this example, because if, for example, beef tallow based emulsion is used, the minimum phase inversion time Tmin is 0.12 sec from FIG. 30, and also if the highest rolling speed is 2000 mpm and the reduction rates of the fourth and fifth mill stands are 35% and 30%, respectively, the strip speeds on the entrance side of the fourth and fifth mill stands are 910 mpm and 1400 mpm, respectively.

The emulsion of the first rolling oil supply system was supplied under the rolling oil supply conditions of example 5, emulsion with an average particle diameter of 20 μm was supplied from the second rolling oil supply system at a supply rate of 300 l/min, a base material for hard tin plate with a thickness of 1.8 mm and a width of 900 mm was rolled to a thickness of 0.183 mm by changing the rolling speed, and the quantity of oil sticking onto the steel sheet and the friction coefficient of the fifth mill stand were investigated.

Figure 41A:
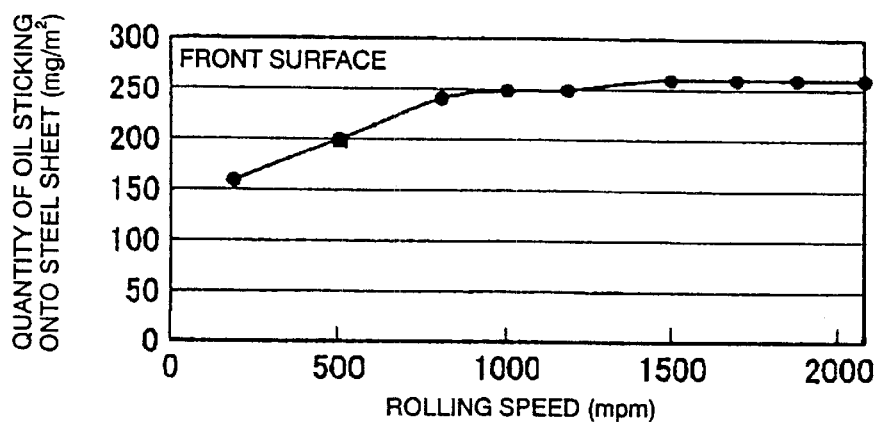
FIGS. 41A and 41B are graphs showing the relationship between the rolling speed and the quantity of oil sticking onto the front and back surface of a steel sheet, respectively.
Figure 41B:
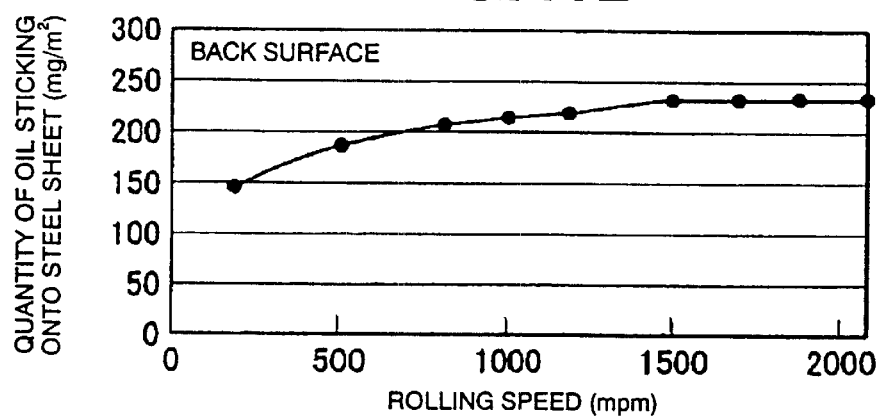

FIGS. 41A and 41B show the relationship between the rolling speed and the quantity of oil sticking onto the front and back surface of a steel sheet, respectively.

Figure 42:
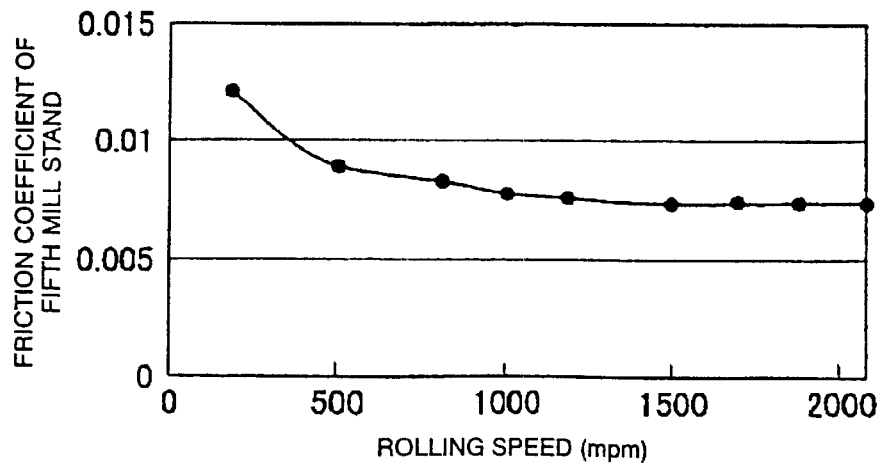
FIG. 42 is a graph showing the relationship between the rolling speed and the friction coefficient of a fifth mill stand.

FIG. 42 shows the relationship between the rolling speed and the friction coefficient of the fifth mill stand.

In the method in accordance with the present invention, even if the rolling speed is 1200 mpm or higher, the quantity of oil sticking onto the steel sheet can be obtained steadily on the front and back surface of the steel sheet. Therefore, the increase in the friction coefficient of the fifth mill stand is restrained, whereby stable friction conditions can be obtained. In particular, at high speed rolling, the friction coefficient scarcely increases, so that chattering caused by insufficient lubrication does not occur.

EXAMPLE 8

In the same method as that of example 7, the concentration and the average particle diameter of emulsion of the second rolling oil supply system were set at 4% and 20 μm, respectively, the supply amount of the second rolling oil supply system at the fifth mill stand was set at 90 to 170 l/min, the concentration and the average particle diameter of emulsion of the first rolling oil supply system were set at 4% and 8 μm, respectively, the supply amount of the first rolling oil supply system at the fifth mill stand was set at 90 to 170 l/min, a base material for hard tin plate with a thickness of 1.8 mm and a width of 900 mm was rolled to a thickness of 0.183 mm by using a work roll with a diameter of 600 mm by changing the rolling speed, and the forward slip ratio was investigated.

For comparison, the same investigation was also conducted in the case where rolling was performed by the conventional method in which only the first rolling oil supply system is used.

Figure 43:
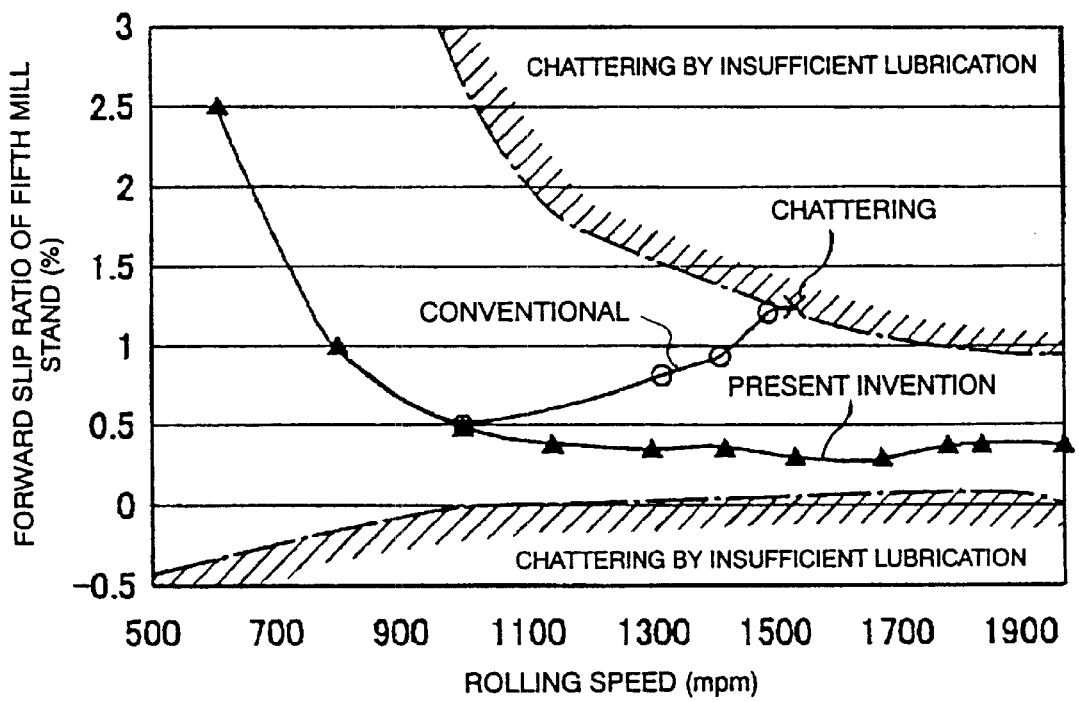
FIG. 43 is a graph showing the relationship between the rolling speed and the forward slip ratio of a fifth mill stand.

FIG. 43 shows the relationship between the rolling speed and the forward slip ratio of the fifth mill stand.

Figure 44:
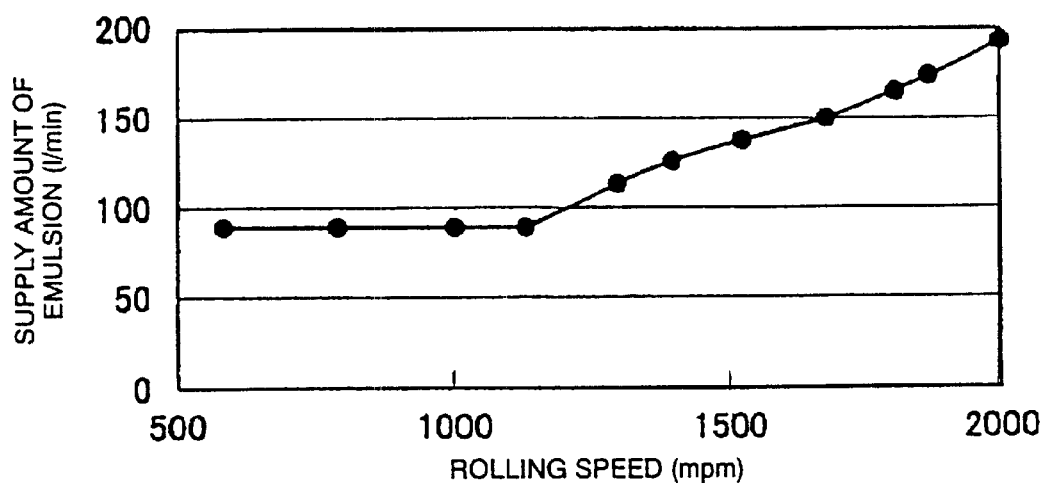
FIG. 44 is a graph showing the relationship between the rolling speed and the supply amount of emulsion in the method in accordance with the present invention.

FIG. 44 shows the relationship between the rolling speed and the supply amount of emulsion in the method in accordance with the present invention.

Figure 45:
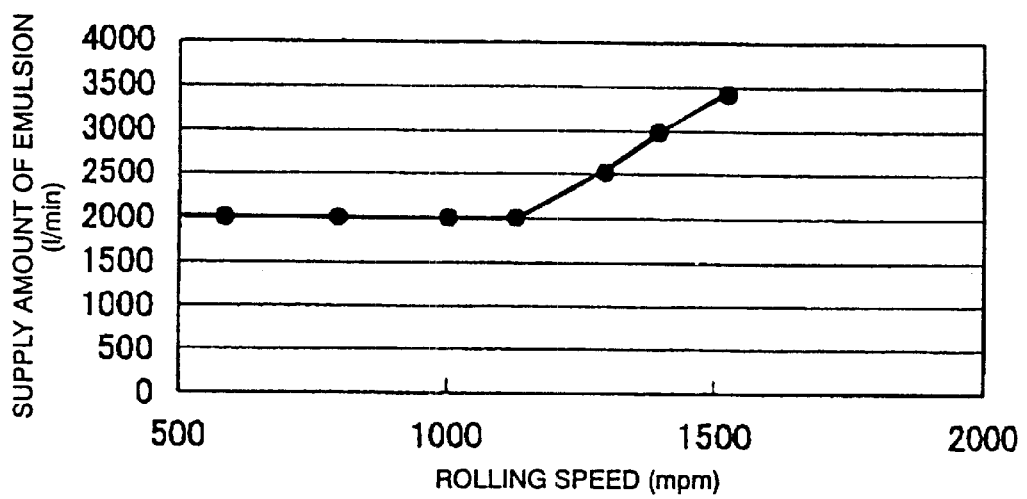
FIG. 45 is a graph showing the relationship between the rolling speed and the supply amount of emulsion in the conventional method.

FIG. 45 shows the relationship between the rolling speed and the supply amount of emulsion in the conventional method.

In the case where the method in accordance with the present invention is used, the supply amount of emulsion is fixed to be 90 l/min, when the rolling speed is not higher than 1000 mpm, and increases with the rolling speed when the rolling speed is higher than 1000 mpm. By controlling the supply amount in this manner, the forward slip ratio during rolling is controlled so as to be a target forward slip ratio of 0.3 to 0.4% when the rolling speed is higher than 1000 mpm. Therefore, steady rolling can be performed, and high speed rolling can be performed at a speed of 2000 mpm without the occurrence of chattering.

On the other hand, in the conventional method, if the rolling speed exceeds 1000 mpm, the forward slip ratio increases. Accordingly, the supply amount of emulsion was increased from 2000 l/min to 3400 l/min. However, chattering occurred at a rolling speed of 1500 mpm. Therefore, high speed rolling at a speed of 1500 mpm or higher cannot be performed.

Figure 46:
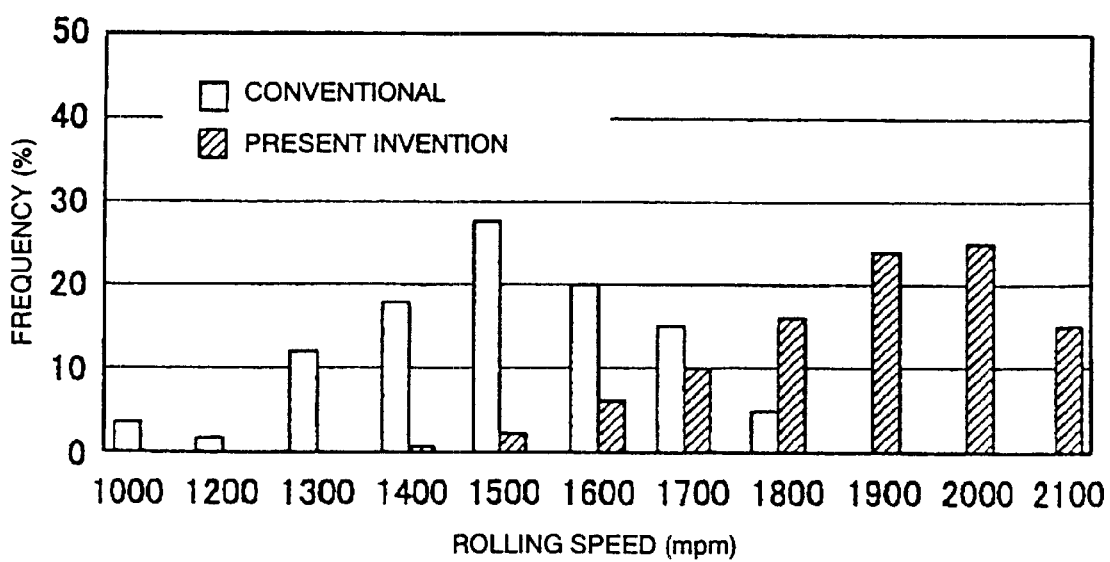
FIG. 46 is a graph showing the distribution of rolling speeds capable of rolling a base material for hard tin plate.

FIG. 46 shows the distribution of rolling speeds capable of rolling a base material for hard tin plate without the occurrence of chattering in the case where the base material for hard tin plate is actually rolled to a thickness of 0.21 mm or 3smaller under the conditions of this embodiment by changing the rolling speed.

In the method in accordance with the present invention, the average rolling speed is 1900 mpm, which has been improved greatly as compared with the average rolling speed of 1500 mpm in the conventional method.

EXAMPLE 9

Figure 47:
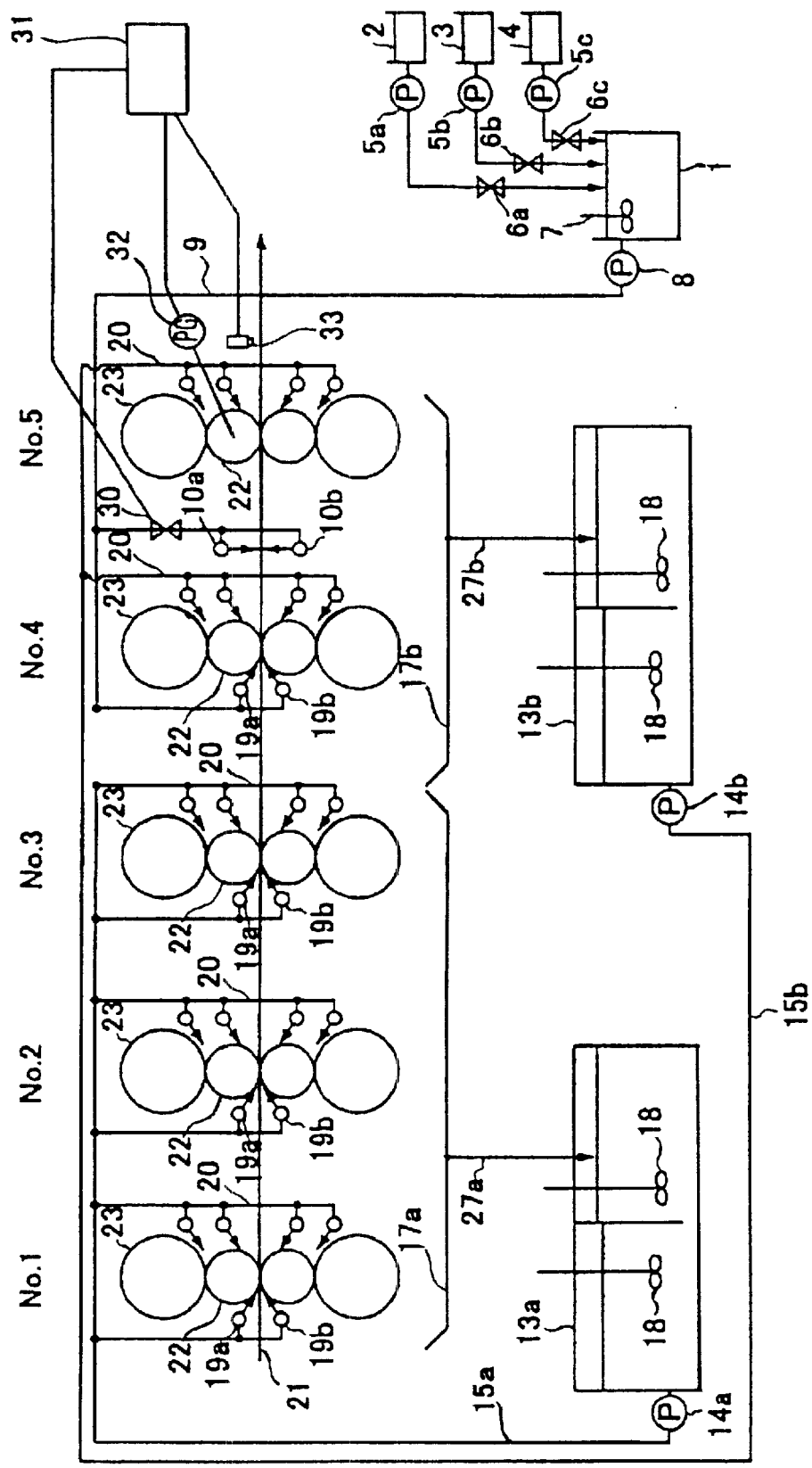
FIG. 47 is a schematic diagram showing still another example of a method for supplying rolling oil for cold rolling in accordance with the present invention.

FIG. 47 shows still another example of a method for supplying rolling oil for cold rolling in accordance with the present invention.

This method is an example in which the lubrication of the fourth mill stand is accomplished by the first rolling oil supply system, and the lubrication of only the fifth mill stand is accomplished by the second rolling oil supply system in the method shown in FIG. 40.

The emulsion of the second rolling oil supply system, passing through the supply line 9 by means of the pump 8, is supplied onto the front surface of steel sheet through the spray headers 10a and 10b provided at a position 3.5 m distant from the roll bite while the supply amount thereof is controlled by a valve 30 whose opening is regulated by a controller 31 so that the forward slip ratio of the fifth mill stand is within a stable range in which chattering does not occur.

The following is a description of a procedure for regulating the opening of the valve 30.

(1) The rotational speed of work roll, which is measured by a pulse generator shown in FIG. 47, and the strip speed, which is measured by a strip speed meter 33 on the delivery side of mil stand, are substituted into the following equation (15) to determine the forward slip ratio fs (%) during rolling of the fifth mill stand.

$$fs = (Vs - \pi \times D \times n) \times 100 / (\pi \times D \times n) \quad (15)$$

where, Vs is the strip speed (m/min) on the delivery side of mill stand, D is the diameter (m) of work roll, and n is the rotational speed (rpm) of roll.

(2) A deviation Δfs from a target forward slip ratio fs* (%) is calculated from the following equation (16).

$$\Delta fs = fs - fs^* \quad (16)$$

The target forward slip ratio fs* is determined by investigating a stable range of forward slip ratio in which no chattering occurs as shown in FIG. 31.

(3) A change amount ΔQ (l/min) of the supply amount of emulsion of the second rolling oil supply system is calculated from the following equation (17).

$$\Delta Q = (\Delta fs/100)/[(\delta fs/\delta \mu) \times (\delta \mu Q)] \quad (17)$$

where, $\mu$ is the friction coefficient, $\delta fs/\delta \mu$ is the influence coefficient of the friction coefficient $\mu$ with respect to the forward slip ratio fs, and $\delta fs/\delta \mu$ is the influence coefficient of the supply amount of emulsion Q with respect to the coefficient of friction $\mu$. Also, $\delta fs/\delta \mu$ is given by the following derived function equation (18) regarding the friction coefficient $\mu$ in the forward slip ratio equation of Bland & Ford, for example.

$$\delta fs/\delta \mu = 1/(2 \times \mu^2) \times \{\tan[(h \times Hn)^{1/2}/($$
$$R' \times 2)^{1/2}]/\cos^2[(h \times Hn)^{1/2}/(R' \times 2)^{1/2}]$$
$$\} \times [h/(H \times 2 \times Hn)]^{1/2} \times \ln\{(H \times (1 - \sigma b/km)/[$$
$$h \times (1 - \sigma f/km)]\} \quad (18)$$

where, Hn is expressed by the following equation (19).

$$Hn = (R'/h)^{1/2} \times \tan^{-1}[(H-h)^{1/2}/h$$
$$\frac{1}{2}] - 1/(2 \times \mu) \times \ln\{[H \times (1-\sigma b/km)]/[h \times (1-\sigma f/km)]\} \quad (19)$$

where, H and h are strip thicknesses (mm) on the entrance and delivery sides of mill stand, respectively, R' is the flattened radius (mm) of roll, $\sigma b$ and $\sigma f$ are the front and rear unit tensions (kg/mm²) during rolling, respectively, and km is the average flow resistance (kg/mm²) of steel sheet.

The average flow resistance km and the friction coefficient $\mu$ during rolling are determined by substituting measured load P (ton) during rolling and fs into the following rolling load equation of Hill (20) and forward slip ratio equation of Bland & Ford (21).

$$P = WH \times [1 - (7 \times \sigma b + 3 \times \sigma f)/(10 \times km)] \times$$
$$km \times [R' \times (H-h)]^{1/2} \times \{1.08 + 1.79 \times [(H-h)/H$$
$$] \times (h/H)^{1/2} \times \mu \times (R'/h)^{1/2} - 1.02 \times$$
$$[(H-h)/H]\} \quad (20)$$

$$fs = \tan^2[(h \times Hn)^{1/2}/(R' \times 2)$$
$$\frac{1}{2}] \times 100 \quad (21)$$

where, WH is the width (mm) of steel sheet.

$\delta \mu/\delta Q$ is determined based on the data taken during rolling and in operation.

One example thereof will be given below.

The relationship between the supply amount of emulsion and 2 the thickness of plated out oil film $P\phi$ ($\mu$m) is expressed by the following equation (22) as the investigation result obtained by the play out test.

$$P\phi = (c \times f \times Q)/(WS \times Vin) \quad (22)$$

where, WS is spray width (m).

The friction coefficient $\mu$ is expressed by the following equation (23) as a function of ratio of the thickness of plated out oil film $P\phi$ ($\mu$m) to the surface roughness of work roll $\Lambda$ ($\mu$m).

$$\mu = N \times (P\phi/\Lambda)^{-M} \quad (23)$$

where, N and M are constants.

The equation (22) is substituted into the equation (23) to calculate the derived function of the supply amount of emulsion Q, by which the following equation (24) is obtained.

$$\delta \mu/\delta Q = -N \times M \times [(K \times c \times f \times Q)/(WS \times Vin \times \Lambda)]$$
$$-M-1 \times (c \times f)/(WS \times Vin \times \Lambda) \quad (24)$$

where, K is constant.

(4) If the opening of the valve 30 is regulated according to $\Delta Q$, the supply amount of emulsion Q can be controlled.

What is claimed:

1. A method for supplying rolling oil for cold rolling, comprising:

supplying emulsion rolling oil using both: (i) a first rolling oil supply system supplying the emulsion rolling oil to a roll and a steel sheet being rolled in a recirculation mode and (ii) a second rolling oil supply system for supplying the emulsion rolling oil to only the front and back surface of the steel sheet being rolled, wherein the emulsion rolling oil supplied by the first and second rolling oil supply systems comprise an emulsifier of a same type and concentration, and the second rolling oil supply system is controlled so that an average particle diameter of emulsion is larger than an average particle diameter of emulsion of the first rolling oil supply system; and joining the emulsion of the second rolling oil supply system, which has not stuck onto the steel sheet being rolled, to the emulsion of the first rolling oil supply system.

2. The method according to claim 1, wherein the average particle diameter of emulsion of said second rolling oil supply system is not smaller than 20 $\mu$m.

3. The method according to claim 1, wherein said method further comprises replenishing a tank of said first rolling oil supply system with dilution water when a quantity of rolling oil included in the tank of said first rolling oil supply system from said second rolling oil supply system is larger than an amount of oil loss of said first rolling oil supply system.

4. The method according to claim 1, wherein said method further comprises replenishing a tank of said first rolling oil supply system with emulsion in a tank of said second rolling oil supply system as well as dilution water when a quantity of rolling oil included in the tank of said first rolling oil supply system from said second rolling oil supply system is smaller than an amount of oil loss of said first rolling oil supply system.

5. The method according to claim 1, wherein a spray header for supplying the emulsion rolling oil of said second rolling oil supply system to the front and back surface of said steel sheet being rolled is provided at a position on the upstream stand side of a roll bite, which satisfies:

$$L \geq Vin \times Tmin$$

where,

L: distance between roll bite and spray header (m)

Vin: strip speed on the entrance side (m/sec)

Tmin: minimum phase inversion time (sec).

6. The method according to claim 5, wherein a supply amount of emulsion of said second rolling oil supply system is regulated so that a forward slip ratio during rolling is controlled so as to be within a target range.

7. A method for supplying rolling oil for cold rolling, comprising:

supplying emulsion rolling oil using both: (i) a first rolling oil supply system supplying the emulsion rolling oil to a roll and a steel sheet being rolled in a recirculation mode, and (ii) a second rolling oil supply system supplying the emulsion rolling oil to only the front and back surface of the steel sheet being rolled, wherein the emulsion rolling oil supplied by the second rolling oil supply system comprise an emulsifier of a same type but lower concentration as an emulsifier of the first rolling oil supply system, and second rolling oil system is controlled so that an average particle diameter of emulsion is larger than an average particle diameter of emulsion of the first rolling oil supply system;

recovering the emulsion of the second rolling oil supply system which has not stuck onto the steel sheet being rolled, adding an emulsifier to the recovered emulsion so that the concentration of the emulsifier is equal to that of the emulsifier of the first rolling oil supply system, and mechanically agitating the emulsion of the second rolling oil supply system; and joining the emulsion of the second rolling oil supply system, having been agitated mechanically, to the emulsion of the first rolling oil supply system.

8. The method according to claim 7, wherein the average particle diameter of emulsion of said second rolling oil supply system is not smaller than 20 $\mu$m.

9. The method according to claim 7, wherein said method further comprises replenishing a tank of said first rolling oil supply system with dilution water when the quantity of rolling oil included in the tank of said first rolling oil supply system from said second rolling oil supply system is larger than the amount of oil loss of said first rolling oil supply system.

10. The method according to claim 7, wherein in a case where the quantity of rolling oil included in the tank of said first rolling oil supply system from said second rolling oil supply system is smaller than the amount of oil loss of said first rolling oil supply system, the tank of said first rolling oil supply system is replenished with the emulsion of said second rolling oil supply system, to which the additional emulsifier is added so that the concentration of the emulsifier is equal to that of the emulsion of said first rolling oil supply system, as well as dilution water when the emulsion of said second rolling oil supply system is joined to the emulsion of said first rolling oil supply system.

11. The method according to claim 7, wherein a spray header for supplying the emulsion rolling oil of said second rolling oil supply system to the front and back surface of said steel sheet being rolled is provided at a position on an upstream stand side of a roll bite, which satisfies:

$$L \geq Vin \times Tmin$$

where,

L: distance between roll bite and spray header (m)

Vin: strip speed on the entrance side (m/sec)

Tmin: minimum phase inversion time (sec).

12. The method according to claim 11, wherein a supply amount of emulsion of said second rolling oil supply system is regulated so that a forward slip ratio during rolling is controlled so as to be within a target range.

* * * * *